United States Patent
Arkind et al.

(10) Patent No.: US 11,811,142 B2
(45) Date of Patent: Nov. 7, 2023

(54) SKEWED MIMO ANTENNA ARRAY FOR USE IN AUTOMOTIVE IMAGING RADAR

(71) Applicant: Arbe Robotics Ltd., Tel Aviv (IL)

(72) Inventors: Noam Arkind, Givatayim (IL); Yoram Stettiner, Kerem Maharal (IL)

(73) Assignee: Arbe Robotics Ltd.

( * ) Notice: Subject to any disclaimer, the term of this patent is extended or adjusted under 35 U.S.C. 154(b) by 380 days.

(21) Appl. No.: 17/250,797

(22) PCT Filed: Sep. 4, 2019

(86) PCT No.: PCT/IL2019/050989
§ 371 (c)(1),
(2) Date: Mar. 4, 2021

(87) PCT Pub. No.: WO2020/049562
PCT Pub. Date: Mar. 12, 2020

(65) Prior Publication Data
US 2021/0320425 A1  Oct. 14, 2021

(30) Foreign Application Priority Data
Sep. 5, 2018 (IL) .......................... 261636

(51) Int. Cl.
*H01Q 21/06* (2006.01)
*G01S 7/03* (2006.01)
(Continued)

(52) U.S. Cl.
CPC .............. *H01Q 21/061* (2013.01); *G01S 7/03* (2013.01); *G01S 13/931* (2013.01); *H01Q 1/525* (2013.01); *H01Q 21/28* (2013.01)

(58) Field of Classification Search
CPC ...... H01Q 21/28; H01Q 1/525; H01Q 21/061; G01S 13/931; G01S 7/03
See application file for complete search history.

(56) References Cited

U.S. PATENT DOCUMENTS 3,603,989 A   9/1971  Caspers
3,981,012 A   9/1976  Brault
(Continued)

FOREIGN PATENT DOCUMENTS

CN    1967286 A    5/2007
CN  101950851 A    1/2011
(Continued)

OTHER PUBLICATIONS

U. Prechtel et al.: "Short-Range Mimo Radar System Considerations", 2012 6th European Conference On Antennas and Propagation (EUCAP), Mar. 1, 2012 (Mar. 1, 2012), pp. 1742-1745, Xp055147564, DOI:10.1109/EUCAP.2012.6206599, ISBN: 978-1-45-770919-7.
(Continued)

*Primary Examiner* — Graham P Smith
(74) *Attorney, Agent, or Firm* — Zaretsky Group PC; Howard Zaretsky

(57) ABSTRACT

A novel and useful system and method of constructing a skewed or staggered multiple input multiple output (MIMO) antenna array system for automotive radar having high azimuth and elevation angular resolution and accuracy that provides increased effective aperture while using a low number of TX and RX elements. Improved element separation is achieved by distancing (i.e. staggering or skewing) RX rows and TX columns by using row and column circular shifts along their major axis. Due to the physical size of antenna elements, it is not physically possible to place the rows and columns in the full array symmetric RX-TX pattern without creating a gap in the center of the virtual array. This array reduces the overall size of the antenna achieving a compact size and low side lobe level (SLL). In addition, to minimize the resulting RX saturation of elements physically close to TX elements, the system blanks (Continued)

(i.e. zeros) the data for those elements. The rows of the transmit columns may also be staggered, either symmetrically or asymmetrically depending on the skewing factor.

20 Claims, 14 Drawing Sheets

(51) Int. Cl.
G01S 13/931 (2020.01)
H01Q 1/52 (2006.01)
H01Q 21/28 (2006.01)

(56) References Cited

U.S. PATENT DOCUMENTS

| | | | |
|---|---|---|---|
| 4,166,980 A | 9/1979 | Apostolos |
| 4,197,540 A | 4/1980 | Riggs |
| 4,494,083 A | 1/1985 | Josefsson |
| 4,926,185 A | 5/1990 | Wittenberg |
| 5,063,603 A | 11/1991 | Burt |
| 5,424,742 A | 6/1995 | Long |
| 5,430,445 A | 7/1995 | Peregrim |
| 5,442,362 A | 8/1995 | Zwarts |
| 5,923,280 A | 7/1999 | Farmer |
| 5,955,992 A | 9/1999 | Shattil |
| 6,028,548 A | 2/2000 | Farmer |
| 6,104,673 A | 8/2000 | Cole |
| 6,172,939 B1 | 1/2001 | Cole |
| 6,204,803 B1 | 3/2001 | Uehara |
| 6,363,033 B1 | 3/2002 | Cole |
| 6,614,384 B2 | 9/2003 | Hall |
| 6,822,604 B2 | 11/2004 | Hall |
| 6,828,929 B2 | 12/2004 | Barbella |
| 6,865,216 B1 | 3/2005 | Beamish |
| 6,888,887 B1 | 5/2005 | Shattil |
| 6,989,782 B2 | 1/2006 | Walker |
| 7,071,868 B2 | 7/2006 | Woodington |
| 7,129,886 B2 | 10/2006 | Hall |
| 7,308,043 B1 | 12/2007 | Frank |
| 7,541,968 B2 | 6/2009 | Hall |
| 7,639,171 B2 | 12/2009 | Alland |
| 7,804,445 B1 | 9/2010 | Fiore |
| 7,835,455 B2 | 11/2010 | Shattil |
| 8,035,038 B2 | 10/2011 | Cheng |
| 8,175,134 B1 | 5/2012 | Giallorenzi |
| 8,599,062 B2 | 12/2013 | Szajnowski |
| 8,762,139 B2 | 6/2014 | Furuta |
| 8,803,732 B2 | 8/2014 | Antonik |
| 8,970,425 B2 | 3/2015 | Nogueira-Nine |
| 9,250,322 B2 | 2/2016 | Newman |
| 9,557,585 B1 | 1/2017 | Yap |
| 9,645,228 B1 | 5/2017 | Doerry |
| 9,791,564 B1 | 10/2017 | Harris |
| 10,078,129 B2 | 9/2018 | Sugino |
| 10,082,570 B1 | 9/2018 | Izadian |
| 10,094,920 B2 | 10/2018 | Rao |
| 10,359,504 B2 | 7/2019 | Fetterman |
| 10,451,723 B2 | 10/2019 | Chiu |
| 11,199,617 B2 | 12/2021 | Hakobyan |
| 11,277,902 B2 | 3/2022 | Snir |
| 2002/0016547 A1 | 2/2002 | Bang |
| 2002/0130807 A1 | 9/2002 | Hall |
| 2003/0151476 A1 | 8/2003 | Salmela |
| 2004/0021599 A1 | 2/2004 | Hall |
| 2004/0150552 A1 | 8/2004 | Barbella |
| 2004/0196172 A1 | 10/2004 | Wasiewicz |
| 2005/0083199 A1 | 4/2005 | Hall |
| 2005/0156780 A1 | 7/2005 | Bonthron |
| 2005/0232182 A1 | 10/2005 | Shattil |
| 2007/0040728 A1 | 2/2007 | Nishimura |
| 2007/0171123 A1 | 7/2007 | Nakano |
| 2007/0205847 A1 | 9/2007 | Kushta |
| 2008/0111686 A1 | 5/2008 | Hall |
| 2008/0258964 A1 | 10/2008 | Schoeberl |
| 2008/0284641 A1 | 11/2008 | Spreadbury |
| 2008/0317345 A1 | 12/2008 | Wiedemann |
| 2009/0085800 A1 | 4/2009 | Alland |
| 2010/0074620 A1 | 3/2010 | Linnartz |
| 2010/0141508 A1 | 6/2010 | Nguyen |
| 2011/0122014 A1 | 5/2011 | Szajnowski |
| 2011/0279669 A1 | 11/2011 | Longstaff |
| 2012/0056780 A1 | 3/2012 | Antonik |
| 2012/0112955 A1 | 5/2012 | Ando |
| 2012/0146846 A1 | 6/2012 | Antonik |
| 2012/0169523 A1 | 7/2012 | Lee |
| 2012/0235859 A1 | 9/2012 | Hayase |
| 2012/0313810 A1 | 12/2012 | Nogueira-Nine |
| 2013/0009806 A1 | 1/2013 | Newman |
| 2013/0257670 A1 | 10/2013 | Sovero |
| 2014/0022113 A1 | 1/2014 | Nogueira-Nine |
| 2014/0079248 A1 | 3/2014 | Short |
| 2014/0211438 A1 | 7/2014 | Lin |
| 2014/0218226 A1 | 8/2014 | Raz |
| 2014/0320231 A1 | 10/2014 | Seler |
| 2014/0355385 A1 | 12/2014 | Inagaki |
| 2015/0061928 A1 | 3/2015 | Cornic |
| 2015/0323650 A1 | 11/2015 | Schuman |
| 2016/0018511 A1 | 1/2016 | Nayyar |
| 2016/0061942 A1 | 3/2016 | Rao |
| 2016/0084941 A1 | 3/2016 | Arage |
| 2016/0131738 A1 | 5/2016 | Prechtel |
| 2016/0139254 A1 | 5/2016 | Wittenberg |
| 2016/0187477 A1 | 6/2016 | Wang |
| 2016/0285611 A1 | 9/2016 | Fischer |
| 2016/0291146 A1* | 10/2016 | Wang ................... G01S 13/867 |
| 2016/0334502 A1 | 11/2016 | Ali |
| 2016/0377711 A1 | 12/2016 | Arage |
| 2017/0131394 A1 | 5/2017 | Roger |
| 2017/0219689 A1 | 8/2017 | Hung |
| 2017/0307744 A1 | 10/2017 | Loesch |
| 2017/0343648 A1 | 11/2017 | Trotta |
| 2018/0045819 A1 | 2/2018 | Cornic |
| 2018/0074168 A1 | 3/2018 | Subburaj |
| 2018/0095162 A1 | 4/2018 | Fetterman |
| 2018/0149736 A1 | 5/2018 | Alland |
| 2018/0166794 A1 | 6/2018 | Raphaeli |
| 2018/0172816 A1 | 6/2018 | Chiu |
| 2018/0204358 A1 | 7/2018 | An |
| 2018/0350751 A1 | 12/2018 | Sun |
| 2019/0004167 A1 | 1/2019 | Rao |
| 2019/0050372 A1 | 2/2019 | Zeng |
| 2019/0212428 A1 | 7/2019 | Santra |
| 2019/0235066 A1 | 8/2019 | Iida |
| 2019/0265346 A1 | 8/2019 | Hakobyan |
| 2019/0339382 A1 | 11/2019 | Hess |
| 2020/0011968 A1 | 1/2020 | Hammes |
| 2020/0176393 A1 | 6/2020 | Ketterson |
| 2020/0388578 A1 | 12/2020 | Lim |
| 2020/0393536 A1 | 12/2020 | Stettiner |
| 2021/0156980 A1 | 5/2021 | Stettiner |
| 2021/0156981 A1 | 5/2021 | Stettiner |
| 2021/0156982 A1 | 5/2021 | Stettiner |
| 2021/0184340 A1 | 6/2021 | Stav |
| 2021/0263147 A1 | 8/2021 | Bauer |
| 2021/0275056 A1 | 9/2021 | McMahon |
| 2021/0293923 A1 | 9/2021 | Arkind |
| 2021/0318413 A1 | 10/2021 | Arkind |
| 2021/0320425 A1 | 10/2021 | Arkind |

FOREIGN PATENT DOCUMENTS

| | | |
|---|---|---|
| CN | 102866401 A | 1/2013 |
| CN | 105814262 A | 7/2016 |
| CN | 106100696 A | 11/2016 |
| CN | 106249219 A | 12/2016 |
| CN | 108089163 A | 5/2018 |
| DE | 102013216251 A1 | 2/2015 |
| DE | 102015218538 A1 | 3/2017 |
| DE | 102016224900 A1 | 6/2018 |
| EP | 0132795 A2 | 2/1985 |
| EP | 3165941 A1 | 5/2017 |
| EP | 3244231 A1 | 11/2017 |
| GB | 2462148 A | 2/2010 |
| WO | 2013/045232 A1 | 4/2013 |

(56) References Cited

FOREIGN PATENT DOCUMENTS

| WO | 2015/126505 A2 | 8/2015 |
| WO | 2017/069679 A1 | 4/2017 |
| WO | 2017/208670 A1 | 12/2017 |
| WO | 2018/138725 A1 | 8/2018 |
| WO | 2018/142395 A1 | 8/2018 |
| WO | 2018/142396 A1 | 8/2018 |

OTHER PUBLICATIONS

Comparative Performance Analysis of Hamming, Hanning and Blackman Window by Prajoy Podder at International Journal of Computer Applications (0975-8887) vol. 96—No. 18, Jun. 2014 (Year: 2014).

Jason Yu et al: "Multiband chirp synthesis for frequency-hopped FMCW radar", Signals, Systems and Computers, 2009 Conference Record of the Forty-Third Asilomar Conference On, IEEE, Piscataway, NJ, USA, Nov. 1, 2009 (Nov. 1, 2009), pp. 1315-1319, XP031679466, ISBN: 978-1-4244-5825-7.

Laribi Amir et al: "A new height-estimation method using FMCW radar Doppler beam sharpening", 2017 25th European Signal Processing Conference (EUSIPCO), EURASIP, Aug. 28, 2017 (Aug. 28, 2017), pp. 1932-1396, XP033236275, DOI: 10.23919/EUSIPCO. 2017.8081546 [retrieved on Oct. 23, 2017].

Miralles E, Multerer T, Ganis A, Schoenlinner B, Prechtel U, Meusling A, Mietzner J, Weckerle C, Esteban H, Vossiek M, Loghik M. Multifunctional and compact 3D FMCW MIMO radar system with rectangular array for medium-range applications. IEEE Aerospace and Electronic Systems Magazine. May 7, 2018;33(4):46-54. Enric Miralles May 7, 2018 (May 7, 2018).

\* cited by examiner

SKEWED MIMO ANTENNA ARRAY FOR USE IN AUTOMOTIVE IMAGING RADAR

FIELD OF THE DISCLOSURE

The subject matter disclosed herein relates to the field of imaging radar, sonar, ultrasound, and other sensors for performing range measurement via FMCW signals and/or angle measurement via digital beam forming and array processing and more particularly relates to a skewed multiple input multiple output (MIMO) antenna array system having high azimuth and elevation angular resolution and accuracy that provides increased effective aperture while using a low number of TX and RX elements.

BACKGROUND OF THE INVENTION

In recent years many industries are moving to autonomous solutions such as the automotive industry, deliveries etc. These autonomous platforms should operate in the environment while interacting with both the stationary and moving objects. For this purpose, these systems require a sensor suite which allows them to sense their surrounding in a reliable and efficient manner. For example, in order for an autonomous car to plan its route on a road with other cars on it, the trajectory planner must have a 3D map of the environment with indication of moving objects.

Visual sensors are also degraded by bad weather and poor visibility due to fog, smoke, sand, storms, etc.). They are also limited in estimating radial velocities. Light Detection And Ranging (LIDAR) devices are used to measure distance to a target by illuminating that target with a laser light. These devices, however, are expensive, have moving parts, and have very limited range. Radar is an augmenting and not a replacing technology.

Due to natural limitations of visual sensors in range accuracy and reliability problems with optical (e.g., laser) technologies, the best solution to generate this 3D map is via a radar technology. This imposes a new set of requirements which modern radars do not comply with.

Generally, the larger the aperture of the receiving antenna, the more radiation is received which results in higher sensitivity, or equivalently, a narrower main lobe. Hence, the receiving antenna can receive weaker signals and provide a relatively accurate indication regarding their direction.

On the other hand, vehicular radars, including automotive imaging radars, require less sensitivity since the range is relatively short and the signals that are reflected from a target are relatively strong. Vehicular radars, however, are not required to detect point targets, such as an aircraft detected by a missile, but do require high accuracy in order to provide an image of the environment information which is used an input to a Simultaneous Localization And Mapping (SLAM) algorithm which detects the location of obstacles such as other cars or pedestrians in close vicinity. A narrow lobe with high accuracy will be able to provide sharper contour lines of the target image. The lobe width is determined solely by the equivalent aperture, normalized to the wavelength of the transmitted radar signal and not by the number of receiving antenna elements within the aperture, which affects the sensitivity, i.e. the ability to detect weak reflected signals, and ambiguity resolution and the side lobes level.

Another critical performance parameter of imaging radars is the side lobe levels of the antenna array. In the event there is a large object such as a wall located in the direction of a side lobe, an attenuated version of the reflections from the object will appear to be in the direction of the main lobe. This may mask reflections that originate from an obstacle, such as a pedestrian, or create a phantom obstacle which may cause the vehicle to stop.

Therefore, in automotive imaging radars, it is critical to reduce side lobes as much as possible. In addition, there is a need for a compact radar switch array antenna having high azimuth and elevation angular resolution and accuracy that provides increased effective aperture, while using a low number of transmit (TX) and receive (RX) elements that meets cost, space, power and reliability requirements.

Recently, applications of radars in the automotive industry have started to emerge. High-end automobiles already have radars that provide parking assistance and lane departure warning to the driver. Currently, there is growing interest in self-driving cars and it is currently considered to be the main driving force in the automotive industry in the coming years.

Self-driving cars offer a new perspective on the application of radar technology in automobiles. Instead of only assisting the driver, automotive radars will be capable of taking an active role in the control of the vehicle. They are thus likely to become a key sensor of the autonomous control system of a vehicle.

Radar is preferred over other alternatives such as sonar or LIDAR as it is less affected by weather conditions and can be made very small to decrease the effect of the deployed sensor on the aerodynamics and appearance of the vehicle. Frequency Modulated Continuous Wave (FMCW) radar is a type of radar that offers several advantages compared to the others. For example, it ensures the range and velocity information of the surrounded objects can be detected simultaneously. This information is important for the control system of the self-driving vehicle to provide safe and collision-free operation.

For shorter range detection, as in automotive radar, FMCW radar is commonly used. Several benefits of FMCW radar in automotive applications include: (1) FMCW modulation is relatively easy to generate, provides large bandwidth, high average power, good short range performance, high accuracy, low cost due to low bandwidth processing and permits very good range resolution and allows the Doppler shift to be used to determine velocity, (2) FMCW radar can operate at short ranges, (3) FMCW sensors can be made small having a single RF transmission source with an oscillator that is also used to downconvert the received signal, (4) since the transmission is continuous, the modest output power of solid state components is sufficient.

A radar system installed in a car should be able to provide the information required by the control system in real-time. A baseband processing system is needed that is capable of providing enough computing power to meet real-time system requirements. The processing system performs digital signal processing on the received signal to extract the useful information such as range and velocity of the surrounded objects.

Currently, vehicles (especially cars) are increasingly equipped with technologies designed to assist the driver in critical situations. Besides cameras and ultrasonic sensors, car manufacturers are turning to radar as the cost of the associated technology decreases. The attraction of radar is that it provides fast and clear-cut measurement of the velocity and distance of multiple objects under any weather conditions. The relevant radar signals are frequency modulated and can be analyzed with spectrum analyzers. In this manner, developers of radar components can automatically detect, measure and display the signals in time and frequency domains, even up to frequencies of 500 GHz.

There is also much interest now in using radar in the realm of autonomous vehicles which is expected to become more prevalent in the future. Millimeter wave automotive radar is suitable for use in the prevention of collisions and for autonomous driving. Millimeter wave frequencies from 77 to 81 GHz are less susceptible to the interference of rain, fog, snow and other weather factors, dust and noise than ultrasonic radars and laser radars. These automotive radar systems typically comprise a high frequency radar transmitter which transmits a radar signal in a known direction. The transmitter may transmit the radar signal in either a continuous or pulse mode. These systems also include a receiver connected to the appropriate antenna system which receives echoes or reflections from the transmitted radar signal. Each such reflection or echo represents an object illuminated by the transmitted radar signal.

Advanced driver assistance systems (ADAS) are systems developed to automate, adapt, and enhance vehicle systems for safety and better driving. Safety features are designed to avoid collisions and accidents by offering technologies that alert the driver to potential problems, or to avoid collisions by implementing safeguards and taking over control of the vehicle. Adaptive features may automate lighting, provide adaptive cruise control, automate braking, incorporate GPS/traffic warnings, connect to smartphones, alert driver to other cars or dangers, keep the driver in the correct lane, or show what is in blind spots.

There are many forms of ADAS available; some features are built into cars or are available as an add-on package. Also, there are aftermarket solutions available. ADAS relies on inputs from multiple data sources, including automotive imaging, LIDAR, radar, image processing, computer vision, and in-car networking. Additional inputs are possible from other sources external to the primary vehicle platform, such as other vehicles, referred to as vehicle-to-vehicle (V2V), or vehicle-to-infrastructure system (e.g., mobile telephony or Wi-Fi data network).

Advanced driver assistance systems are currently one of the fastest growing segments in automotive electronics, with steadily increasing rates of adoption of industry wide quality standards, in vehicular safety systems ISO 26262, developing technology specific standards, such as IEEE 2020 for image sensor quality and communications protocols such as the Vehicle Information API.

In recent years many industries are moving to autonomous solutions such as the automotive industry, deliveries, etc. These autonomous platforms operate in the environment while interacting with both stationary and moving objects. For this purpose, these systems require a sensor suite which allows them to sense their surroundings in a reliable and efficient manner. For example, in order for an autonomous vehicle to plan its route on a road with other vehicles on it, the trajectory planner must have a 3D map of the environment with an indication of the moving objects.

Visual sensors are also degraded by bad weather and poor visibility (e.g., fog, smoke, sand, rain storms, snow storms, etc.). They are also limited in estimating radial velocities. Light Detection and Ranging devices (LIDARs) are used to measure distance to a target by illuminating that target with a laser light. These, however, are expensive, as most have moving parts and very limited range. Thus, automotive radar is seen as an augmenting and not replacement technology.

In the automotive field, radar sensors are key components for comfort and safety functions, for example adaptive cruise control (ACC) or collision mitigation systems (CMS). With an increasing number of automotive radar sensors operated close to each other at the same time, radar sensors may receive signals from other radar sensors. The reception of foreign signals (interference) can lead to problems such as ghost targets or a reduced signal-to-noise ratio. Such an automotive interference scenario with direct interference from several surrounding vehicles is shown in FIG. 1.

A well-known way to reduce the number of antenna elements in an array is by using a MIMO technique known as 'virtual array', where separable (e.g., orthogonal) waveforms are transmitted from different antennas (usually simultaneously), and by means of digital processing a larger effective array is generated. The shape of this 'virtual array' is the special convolution of the transmission and reception antennas' positions.

It is also known that by means of bandpass sampling, the de-ramped signal can be sampled with lower A/D frequencies, while preserving the range information of the targets with the ranges matching the designed bandpass filter.

Achieving a high resolution simultaneously in the angular, range and doppler dimensions is a significant challenge due to (inter alia) a linear increment in hardware complexity resolution.

SUMMARY OF THE INVENTION

The present invention a system and method of constructing a skewed or staggered multiple input multiple output (MIMO) antenna array system having high azimuth and elevation angular resolution and accuracy that provides increased effective aperture while using a low number of TX and RX elements. The compact radar switch array antenna has high azimuth and elevation angular resolution and accuracy, and increased effective aperture, while reducing unwanted sidelobes and meets cost, space, power and reliability requirements and is applicable to automotive radar. This is achieved by skewing or staggering the receive rows and transmit columns by a skew factor.

A staggered MIMO antenna array for use in automotive imaging radar. Improved element separation is achieved by distancing (i.e. staggering or skewing) RX rows and TX columns by using row and column circular shifts. Because of the physical size of antenna elements, it is not physically possible to place the rows and columns in the full array symmetric RX-TX pattern without creating a gap in the center of the virtual array. To overcome this problem while minimizing the size of the gap in the center of the array the rows and columns are shifted along their major axis. In one example antenna array, each of the columns is shifted or skewed by $3\lambda/2$ and each of the rows by $3\lambda/2$ along their respective major axis. Note that This array reduces the overall size of the antenna achieving a compact size and low side lobe level (SLL). In addition, to minimize the resulting RX saturation of elements physically close to TX elements, the system blanks (i.e. zeros) the data for those elements.

In another embodiment, not only are the rows and columns of the antenna array staggered (skewed) but the rows of the transmit columns are also staggered, either symmetrically or asymmetrically depending on the skewing factor.

One embodiment of the present invention is directed to a method for increasing the effective aperture of radar switch/MIMO antenna array, using a low number of transmit (TX) and receive (RX) array elements, according to which an array of radar physical receive (RX)/Transmit (TX) elements are arranged in at least two opposing RX rows and at least two opposing TX columns, such that each row includes a plurality of receive (RX) elements uniformly spaced from each other and each column includes a plurality of transmit (TX) elements uniformly spaced from each other, the array forming a rectangular physical aperture.

There is thus provided in accordance with the invention, a multiple input, multiple output (MIMO) antenna frame array for use in a radar system, comprising a first plurality of elements arranged in a first column and a second column, said second column spaced a first distance from the first column, a second plurality of elements arranged in a first row and a second row, the second row spaced a second distance from the first row, wherein the first column and second column are skewed vertically along their major axes in accordance with a first skew factor, and wherein the first row and the second row are skewed horizontally along their major axes in accordance with a second skew factor.

There is also provided in accordance with the invention, a multiple input, multiple output (MIMO) antenna frame array for use in a radar system, comprising a first plurality of elements arranged in a first row and a second row, the second row spaced a first vertical distance from the first row, a second plurality of transmit elements arranged in a first column and a second column, the second column spaced a second horizontal distance from the first column, and wherein the first row, the second row, the first column, and the second column are skewed in circular fashion around a center point.

There is further provided in accordance with the invention, a multiple input, multiple output (MIMO) antenna frame array for use in a radar system, comprising a first plurality of elements arranged in a first row and a second row, the second row spaced a first vertical distance from the first row, a second plurality of elements arranged in a first column and a second column, the second column spaced a second horizontal distance from the first column, wherein the first column and second column are skewed vertically along their major axes in accordance with a first skew factor, wherein the first row and the second row are skewed horizontally along their major axes in accordance with a second skew factor, and wherein the first plurality of elements are organized into a plurality of sub-rows within the first column and the second column, the plurality of sub-rows staggered sub-row by sub-row.

BRIEF DESCRIPTION OF THE DRAWINGS

The present invention is explained in further detail in the following exemplary embodiments and with reference to the figures, where identical or similar elements may be partly indicated by the same or similar reference numerals, and the features of various exemplary embodiments being combinable. The invention is herein described, by way of example only, with reference to the accompanying drawings, wherein.

DETAILED DESCRIPTION

Figure 1:
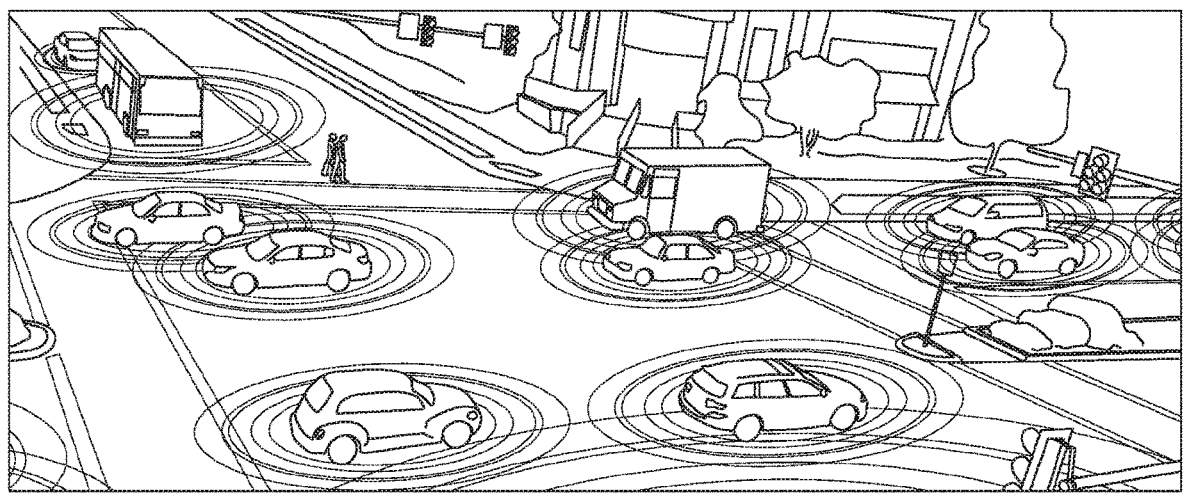
FIG. 1 is a diagram illustrating an example street scene incorporating several vehicles equipped with automotive radar sensor units.

In the following detailed description, numerous specific details are set forth in order to provide a thorough understanding of the invention. It will be understood by those skilled in the art, however, that the present invention may be practiced without these specific details. In other instances, well-known methods, procedures, and components have not been described in detail so as not to obscure the present invention.

Among those benefits and improvements that have been disclosed, other objects and advantages of this invention will become apparent from the following description taken in conjunction with the accompanying figures. Detailed embodiments of the present invention are disclosed herein. It is to be understood, however, that the disclosed embodiments are merely illustrative of the invention that may be embodied in various forms. In addition, each of the examples given in connection with the various embodiments of the invention which are intended to be illustrative, and not restrictive.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

Any reference in the specification to a method should be applied mutatis mutandis to a system capable of executing the method. Any reference in the specification to a system should be applied mutatis mutandis to a method that may be executed by the system.

Throughout the specification and claims, the following terms take the meanings explicitly associated herein, unless the context clearly dictates otherwise. The phrases "in one embodiment," "in an example embodiment," and "in some embodiments" as used herein do not necessarily refer to the same embodiment(s), though it may. Furthermore, the phrases "in another embodiment," "in an alternative embodiment," and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Figure 4:
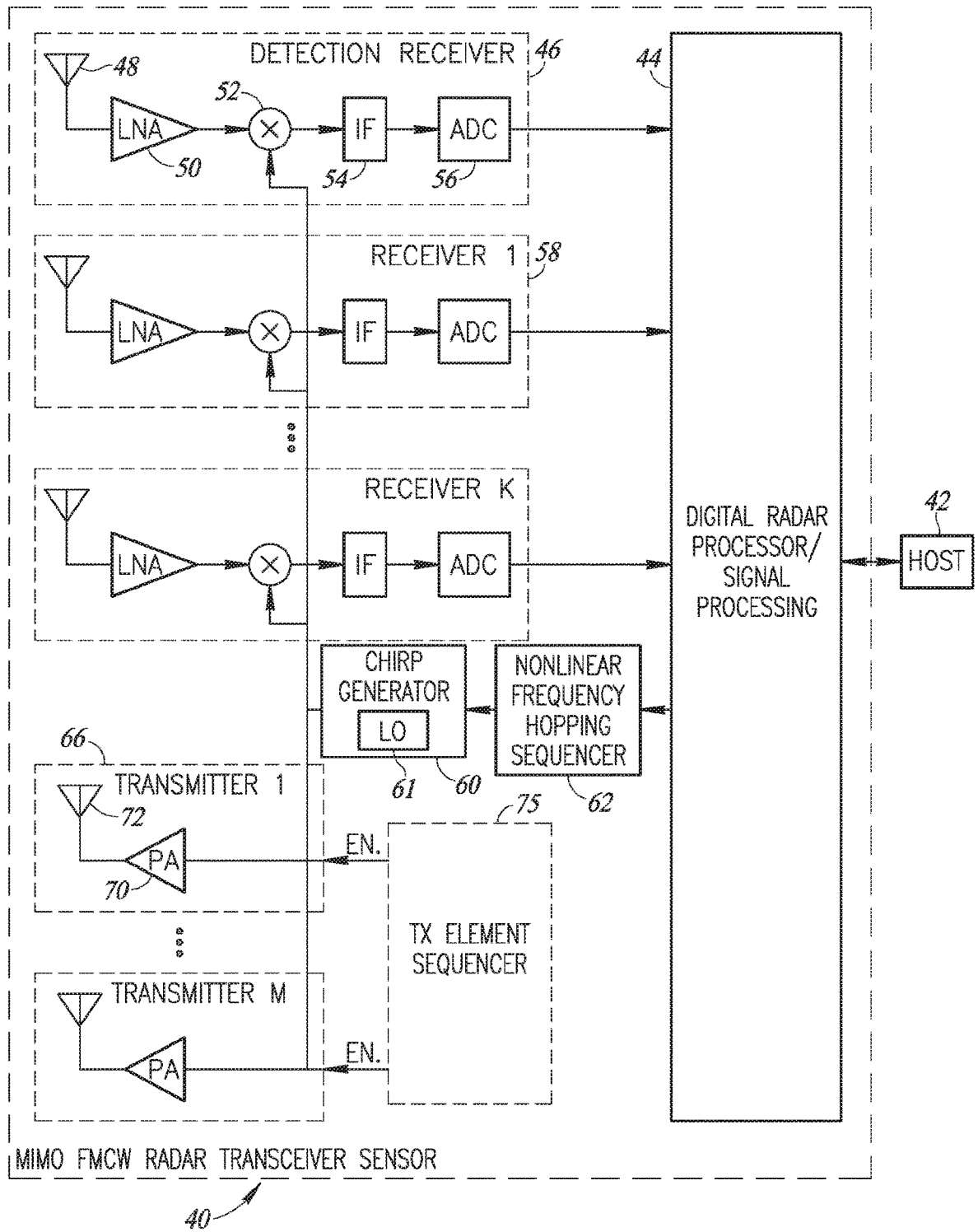
FIG. 4 is a high-level block diagram illustrating an example MIMO FMCW radar in accordance with the present invention.
Figure 5:
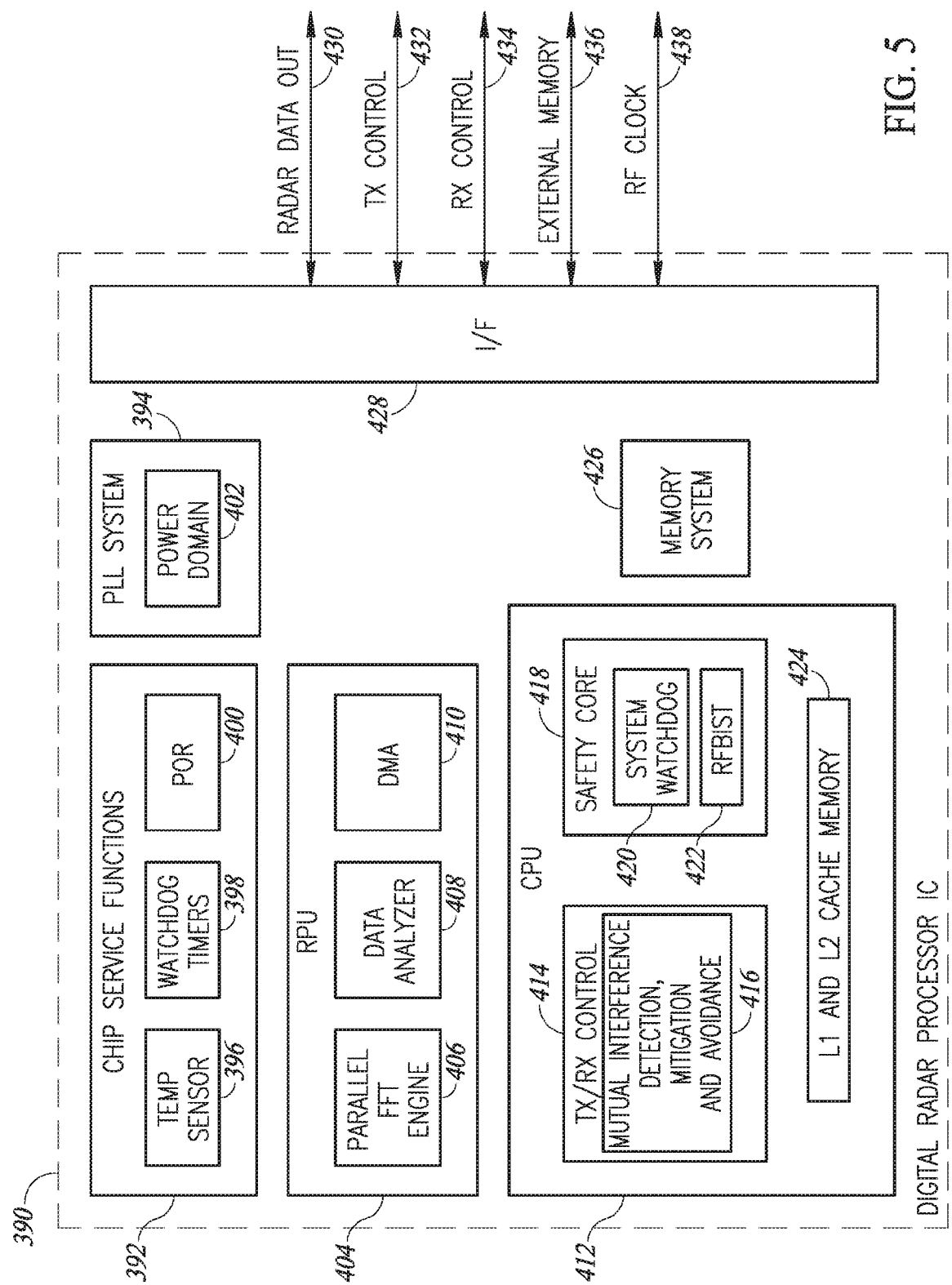
FIG. 5 is a block diagram illustrating an example digital radar processor (DRP) IC constructed in accordance with the present invention.

Frequency modulated continuous wave (FMCW) radars are radars in which frequency modulation is used. The theory of operation of FMCW radar is that a continuous wave with an increasing (or decreasing) frequency is transmitted. Such a wave is referred to as a chirp. An example of a chirp waveform 10 is shown in FIG. 4. A transmitted wave after being reflected by an object is received by a receiver. An example of a transmitted 12 and received (i.e. reflected) 14 chirp waveforms at the receiver is shown in FIG. 5.

Considering the use of radar for automotive applications, vehicle manufacturers can currently make use of four frequency bands at 24 GHz and 77 GHz with different bandwidths. While the 24 GHz ISM band has a maximum bandwidth of 250 MHz, the 76-81 GHz ultrawideband (UWB) offers up to 5 GHz. A band with up to 4 GHz bandwidth lies between the frequencies of 77 to 81 GHz. It is currently in use for numerous applications. Note that other allocated frequencies for this application include 122 GHz and 244 GHz with a bandwidth of only 1 GHz. Since the signal bandwidth determines the range resolution, having sufficient bandwidth is important in radar applications.

Conventional digital beam forming FMCW radars are characterized by very high resolution across radial, angular and Doppler dimensions. Imaging radars are based on the well-known technology of phased arrays, which use a Uniformly Linearly distributed Array (ULA). It is well known that the far field beam pattern of a linear array architecture is obtained using the Fourier transform. Range measurement is obtained by performing a Fourier transform on the de-ramped signal, generated by multiplying the conjugate of the transmitted signal with the received signal. The radar range resolution is determined by the RF bandwidth of the radar and is equal to the speed of light c divided by twice the RF bandwidth. Doppler processing is performed by performing a Fourier transform across the slow time dimension, and its resolution is limited by the Coherent Processing Interval (CPI). i.e. the total transmission time used for Doppler processing.

When using radar signals in automotive applications, it is desired to simultaneously determine the speed and distance of multiple objects within a single measurement cycle. Ordinary pulse radar cannot easily handle such a task since based on the timing offset between transmit and receive signals within a cycle, only the distance can be determined. If speed is also to be determined, a frequency modulated signal is used, e.g., a linear frequency modulated continuous wave (FMCW) signal. A pulse Doppler radar is also capable of measuring Doppler offsets directly. The frequency offset between transmit and receive signals is also known as the beat frequency. The beat frequency has a Doppler frequency component $f_D$ and a delay component $f_T$. The Doppler component contains information about the velocity, and the delay component contains information about the range. With two unknowns of range and velocity, two beat frequency measurements are needed to determine the desired parameters. Immediately after the first signal, a second signal with a linearly modified frequency is incorporated into the measurement.

Determination of both parameters within a single measurement cycle is possible with FM chirp sequences. Since a single chirp is very short compared with the total measurement cycle, each beat frequency is determined primarily by the delay component $f_T$. In this manner, the range can be ascertained directly after each chirp. Determining the phase shift between several successive chirps within a sequence permits the Doppler frequency to be determined using a Fourier transform, making it possible to calculate the speed of vehicles. Note that the speed resolution improves as the length of the measurement cycle is increased.

Multiple input multiple output (MIMO) radar is a type of radar which uses multiple TX and RX antennas to transmit and receive signals. Each transmitting antenna in the array independently radiates a waveform signal which is different than the signals radiated from the other antennae. Alternatively, the signals may be identical but transmitted at non overlapping times. The reflected signals belonging to each transmitter antenna can be easily separated in the receiver antennas since either (1) orthogonal waveforms are used in the transmission, or (2) because they are received at non overlapping times. A virtual array is created that contains information from each transmitting antenna to each receive antenna. Thus, if we have M number of transmit antennas and N number of receive antennas, we will have M·N independent transmit and receive antenna pairs in the virtual array by using only M+N number of physical antennas. This characteristic of MIMO radar systems results in several advantages such as increased spatial resolution, increased antenna aperture, and possibly higher sensitivity to detect slowly moving objects.

As stated supra, signals transmitted from different TX antennas are orthogonal. Orthogonality of the transmitted waveforms can be obtained by using time division multiplexing (TDM), frequency division multiplexing, or spatial coding. In the examples and description presented herein, TDM is used which allows only a single transmitter to transmit at each time.

The radar of the present invention is operative to reduce complexity, cost and power consumption by implementing a time multiplexed MIMO FMCW radar as opposed to full MIMO FMCW. A time multiplexed approach to automotive MIMO imaging radar has significant cost and power benefits associated with it compared to full MIMO radars. Full MIMO radars transmit several separable signals from multiple transmit array elements simultaneously. Those signals need to be separated at each receive channel, typically using a bank of matched filters. In this case, the complete virtual array is populated all at once.

With time multiplexed MIMO, only one transmit (TX) array element transmits at a time. The transmit side is greatly simplified, and there is no need for a bank of matched filters for each receive (RX) channel. The virtual array is progressively populated over the time it takes to transmit from all the TX elements in the array.

Figure 2:
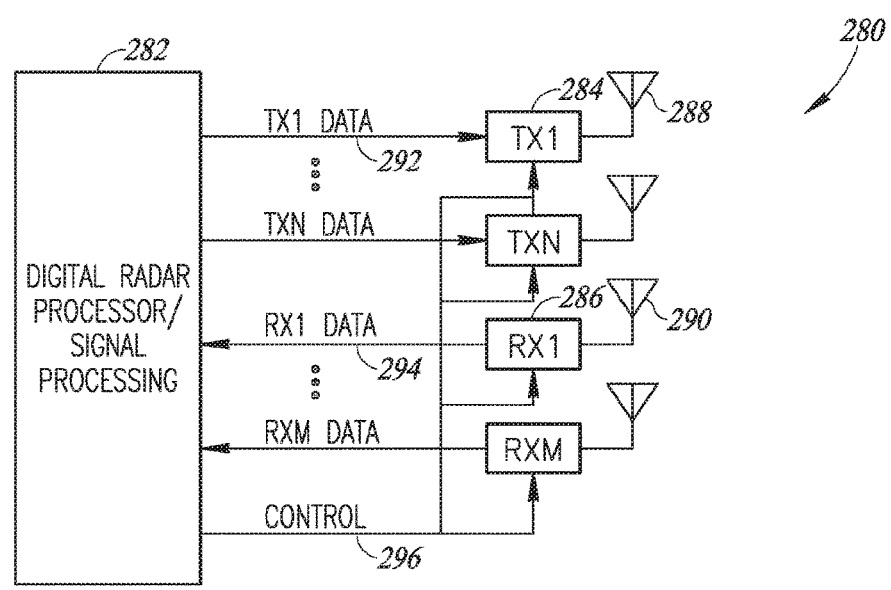
FIG. 2 is a diagram illustrating an example radar system incorporating a plurality of receivers and transmitters.

A high-level block diagram illustrating an example radar system incorporating a plurality of receivers and transmitters is shown in FIG. 2. The radar system, generally referenced 280, comprises a digital radar processor (DRP) for performing, inter alia, signal processing functions, a plurality N of transmitter devices TX1 to TXN 284, each coupled to a transmit antenna 288, a plurality M of receiver devices RX1 to RXN 286, each coupled to a receive antenna 290. TX data lines 292 connect the DRP to the transmitter devices, RX lines 294 connect the receiver devices to the DRP, and control signal 296 are provided by the DRP to each of the transmitter and receiver devices, 284, 286, respectively. Note that N and M may be any positive integer greater than one.

Figure 3:
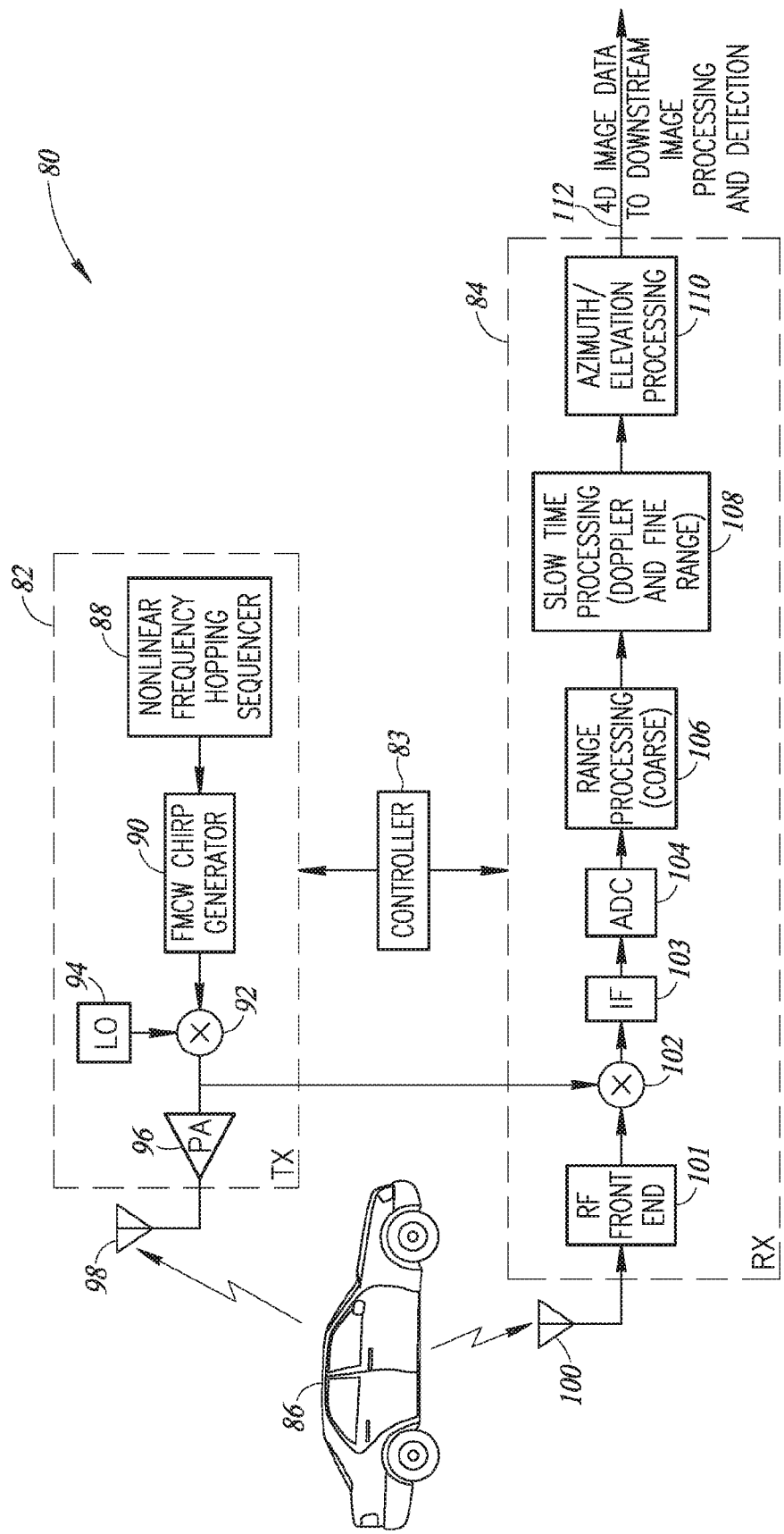
FIG. 3 is a diagram illustrating an example radar transceiver constructed in accordance with the present invention.

A diagram illustrating an example radar transceiver constructed in accordance with the present invention is shown in FIG. 3. The radar transceiver, generally referenced 80, comprises transmitter 82, receiver 84, and controller 83. The transmitter 82 comprises nonlinear frequency hopping sequencer 88, FMCW chirp generator 90, local oscillator (LO) 94, mixer 92, power amplifier (PA) 96, and antenna 98.

The receiver 84 comprises antenna 100, RF front end 101, mixer 102, IF block 103, ADC 104, fast time range processing 106, slow time processing (Doppler and fine range) 108, and azimuth and elevation processing.

In operation, the nonlinear frequency hopping sequencer 88 generates the nonlinear start frequency hop sequence. The start frequency for each chirp is input to the FMCW chirp generator 90 which functions to generate the chirp waveform at the particular start frequency. The chirps are upconverted via mixer 92 to the appropriate band in accordance with LO 94 (e.g., 80 GHz band). The upconverted RF signal is amplified via PA 96 and output to antenna 98 which may comprise an antenna array in the case of a MIMO radar.

On the receive side, the echo signal arriving at antenna 100 is input to RF front end block 101. In a MIMO radar, the receive antenna 100 comprises an antenna array. The signal from the RF front end circuit is mixed with the transmitted signal via mixer 102 to generate the beat frequency which is input to IF filter block 103. The output of the IF block is converted to digital via ADC 104 and input to the fast time processing block 106 to generate coarse range data. The slow time processing block 108 functions to generate both fine range and Doppler velocity data. Azimuth and elevation data are then calculated via azimuth/elevation processing block 110. The 4D image data 112 is input to downstream image processing and detection.

A high-level block diagram illustrating an example MIMO FMCW radar in accordance with the present invention is shown in FIG. 4. The radar transceiver sensor, generally referenced 40, comprises a plurality of transmit circuits 66, a plurality of receive circuits 46, 58, local oscillator (LO) 74, ramp or chirp generator 60 including local oscillator (LO) 61, nonlinear frequency hopping sequencer 62, optional TX element sequencer 75 (dashed box), and signal processing block 44. In operation, the radar transceiver sensor typically communicates with and may be controlled by a host 42. Each transmit block comprises power amplifier 70 and antenna 72. The transmitters receive the transmit signal output of the chirp generator 60 which is fed to the PA in each transmit block. The optional TX element sequencer (dashed) generates a plurality of enable signals 64 that control the transmit element sequence. It is appreciated that the MBC techniques of the present invention can operate in a radar with or without TX element sequencing and with or without MIMO operation.

Each receive block comprises an antenna 48, low noise amplifier (LNA) 50, mixer 52, intermediate frequency (IF) block 54, and analog to digital converter (ADC) 56. In one embodiment, the radar sensor 40 comprises a separate detection wideband receiver 46 dedicated to listening. The sensor uses this receiver to detect the presence of in-band interfering signals transmitted by nearby radar sensors. The processing block uses knowledge of the detected interfering signals to formulate a response (if any) to mitigate and avoid any mutual interference.

Signal processing block 44 may comprise any suitable electronic device capable of processing, receiving, or transmitting data or instructions. For example, the processing units may include one or more of: a microprocessor, a central processing unit (CPU), an application-specific integrated circuit (ASIC), field programmable gate array (FPGA), a digital signal processor (DSP), graphical processing unit (GPU), or combinations of such devices. As described herein, the term "processor" is meant to encompass a single processor or processing unit, multiple processors, multiple processing units, or other suitably configured computing element or elements.

For example, the processor may comprise one or more general purpose CPU cores and optionally one or more special purpose cores (e.g., DSP core, floating point, gate array, etc.). The one or more general purpose cores execute general purpose opcodes while the special purpose cores execute functions specific to their purpose.

Attached or embedded memory comprises dynamic random access memory (DRAM) or extended data out (EDO) memory, or other types of memory such as ROM, static RAM, flash, and non-volatile static random access memory (NVSRAM), removable memory, bubble memory, etc., or combinations of any of the above. The memory stores electronic data that can be used by the device. For example, a memory can store electrical data or content such as, for example, radar related data, audio and video files, documents and applications, device settings and user preferences, timing and control signals or data for the various modules, data structures or databases, and so on. The memory can be configured as any type of memory.

Transmitted and received signals are mixed (i.e. multiplied) to generate the signal to be processed by signal processing unit 44. The multiplication process generates two signals: one with a phase equal to the difference of the multiplied signals, and the other one with a phase equal to the sum of the phases. The sum signal is filtered out and the difference signal is processed by the signal processing unit. The signal processing unit performs all the required processing of the received digital signals and controls the transmitted signal as well. Several functions performed by the signal processing block include determining coarse range, velocity (i.e. Doppler), fine range, elevation, azimuth performing interference detection, mitigation and avoidance, performing simultaneous locating and mapping (SLAM), etc.

A block diagram illustrating an example digital radar processor IC of the present invention is shown in FIG. 5. The radar processor IC, generally referenced 390, comprises several chip service functions 392 including temperature sensor circuit 396, watchdog timers 398, power on reset (POR) circuit 400, etc., PLL system 394 including power domain circuit 402, radar processing unit (RPU) 404 including parallel FFT engine 406, data analyzer circuit 408, direct memory access (DMA) circuit 410 and two-stage processing/control circuit 411, CPU block 412 including TX/RX control block 414, safety core block 418, and L1 and L2 cache memory circuit 424, memory system 426 and interface (I/F) circuit 428.

The TX/RX control circuit 414 may incorporate settling time control for eliminating frequency source settling time, mutual interference, detection, mitigation, and avoidance block 416. The safety core block 418 includes system watchdog timer circuitry 420 and RFBIST circuit adapted to perform continuous testing of the RF elements in the radar system. The I/F circuit includes interfaces for radar output data 430, TX control 432, RX control 434, external memory 436, and RF clock 438.

Note that the digital radar processor circuit 390 can be implemented on monolithic silicon or across several integrated circuits, depending on the particular implementation. Similarly, the transmitter and receiver circuits can be implemented on a single IC or across several ICs depending on the particular implementation.

In one embodiment, the DRP 390 is used in an automotive radar FMCW MIMO based system. Such a system requires a plurality of transmitter and receiver channels to achieve desired range, azimuth, elevation and velocity. The higher the number of channels, the better the resolution performance. Depending on the implementation, multiple transmit channels may be incorporated in a single chip and multiple receive channels may be incorporated in a single chip. The system may comprise multiple TX and RX chips. Each TX and RX chip is operable as part of a larger system adapted to achieve maximum system performance. In one embodiment, the system also includes at least one control channel. The control channel is operative to configure the both TX and RX devices.

The present invention provides a compact radar switch array antenna with high azimuth and elevation angular resolution and accuracy, and increased effective aperture, while using a low number of TX and RX elements. The invention also provides a compact radar antenna array with high azimuth and elevation angular resolution and accuracy, and increased effective aperture, while reducing unwanted side lobes.

One embodiment of the present invention is directed to a method for increasing the effective aperture of a radar switch/MIMO antenna array using a low number of transmit and receive array elements. An array of physical radar receive/transmit elements are arranged in at least two opposing RX rows and at least two opposing TX columns, such that each row includes a plurality of receive elements uniformly spaced from each other and each column includes a plurality of transmit elements uniformly spaced from each other, the array forming a rectangular physical aperture.

Used as a switch array, a first TX element from one column is activated to transmit a radar pulse during a predetermined time slot. Reflections of the first transmission are received by all RX elements, thereby virtually replicating the two opposing RX rows about an origin determined by the location of the first TX element within the rectangular physical aperture.

This process is repeated for all remaining TX elements during different time slots, thereby virtually replicating the two opposing RX rows about an origin determined by the location of each activated TX element within the rectangular physical aperture. During each time period, reflections of the transmission from each TX element are received by all RX elements. In this manner, a rectangular virtual aperture having dimensions twice the dimensions of the rectangular physical aperture is achieved with replicated two opposing RX rows. This virtual aperture determines the radar beam width and sidelobes.

Note that the above replication method works equally well in a MIMO or hybrid switch/MIMO design where some signals are transmitted simultaneously by a plurality of TX array elements using orthogonal waveforms which are later separated in the receiver.

There are two groups of TX columns, one at each side of the physical aperture. Each group may contain one or more columns 18, nominally spaced $\lambda/2$. The separation between the leftmost column of the left group, and the leftmost column of the right group is exactly the spacing between RX elements times the number of RX elements. Likewise, the separation between the bottom row and top row is exactly the spacing between TX elements times the number of TX elements. These two design constraints are crucial for keeping sidelobes low.

In one embodiment, the present invention provides a high resolution compact radar switch array antenna design with high azimuth and elevation angular accuracy and increased effective aperture and reduced unwanted side lobes, using a low number of TX and RX elements.

In order to obtain high resolution a phased array has been designed, based on the MIMO-SAR thin/full approach with switched or non-switched antenna array (SAA). In this type of radar there are several transmitting array elements which are activated at different times or simultaneously using orthogonal waveforms and a set of receiving array elements from which the data is collected simultaneously. In order to achieve high resolution, the radar should have a large aperture with respect to the carrier signal wave length (e.g., for 79 GHz, λ=0.4 cm). Moreover, for full 3D sensing a large aperture is preferred in both azimuth and elevation. To obtain the maximal aperture in both directions, while minimizing the number of elements, and the physical size of the array, a special frame design is proposed, which uses the TX-RX duality in the thin/full array design. According to this design, the RX array is full in azimuth and thin in elevation, and the TX array is full in elevation and thin in azimuth.

Moreover, the resulting equivalent array aperture (which determines the beam width and sidelobe attenuation) is about twice the physical dimensions of the array. Using an appropriate signal processing, the resulting aperture is twice that of the actual frame dimensions.

Conventional solutions increase the number of RX and TX elements within the physical aperture of the array but lack the doubling effect described above. For example, a typical array may include columns of 12 TX elements and rows of 144 RX elements, yielding an array of 144×12=1728 elements. This drastically increases the cost and reduces the reliability of such an array.

On the other hand, the present invention achieves the same accuracy and sidelobes attenuation with only 48 RX elements and 36 TX elements, which gives a total of only 84 elements in the array thus yielding savings of approximately 95%.

The equivalent aperture is normalized to the wavelength λ of the transmitted radar pulse. Therefore, in order to obtain high resolution, it is preferable to transmit at high frequency. In this case, the radar frequency is about 79 GHz.

Note that even though the array requires transmitting 36 subsequent or orthogonal radar pulses to obtain a single frame, the saving in the number of elements is dramatic.

Note that in one embodiment, the size of the physical aperture is A×B, and is defined by the rectangle dimensions, regardless the total number of elements. In switched mode, the system transmits from a single TX element in each time slot and receives the reflections in all RX elements. In this example, transmission begins with transmit element at the lower left location. The RX elements in all rows receive the reflected signals. The order of the transmitting elements in switched mode can be arbitrary.

The effective size of the aperture is increased upwardly without adding additional elements. The next transmission is activated from a TX element one location above the lower left location. This is equivalent to virtually replicating the physical rows one location above. The RX elements in all rows receive the reflected signals. This process in repeated for all TX elements, while each time, an additional replication of the physical rows is added until the areas above the rows are layered with replicated virtual rows. This increases the effective vertical dimension of the aperture rectangle to be 2B, instead of the physical vertical dimension B.

The effective size of the aperture is increased both upwardly and rightwardly without adding more elements as a result of activating all TX elements, one element per time slot. The resulting equivalent aperture size is 2A×2B, twice the aperture determined by the physical elements. This doubling of the physical aperture works equally well for simultaneously transmitting antennas using orthogonal waveforms.

In a second variation of the above array, each of the two columns is duplicated (N−1) times by a series of shifts of λ/2 each, for example to the right, thus creating two triplets of columns. The total number of elements in all six columns is now 6N. For N=3, total number of TX elements is 36. The two 72 element rows are each decimated 3:1 so that each row has 24 elements with a nominal 3/2λ spacing, with the total number of elements in both rows being 48. Transmitting from all 36 elements, whether sequentially or simultaneously, yields an equivalent array of 36×48=1728 elements using only 36 TX and 48 RX array elements.\

The two alternative designs above exemplify the tradeoff between the number of TX and RX elements, e.g., from 12 TX elements and 144 RX elements, to 36 TX elements and 49 RX elements. This is crucial when adapting a design to available radar transceiver chips to save chip hardware count. In one embodiment, the radar front end is based on the ST Microelectronics, Geneva, Switzerland, radar transceiver chip STRADA770, with four RX channels and three TX channels, with an option to connect several of these chips to create larger arrays.

In one embodiment, 12 of these chips are used, yielding 48 RX channels and 36 TX channels, and provides a resolution of about 0.9° in azimuth and 2.4° in elevation at boresight before windowing, with a field of view (FOV) of 90° in azimuth and 22.5° in elevation. The physical size of the array is about 13×10 cm.

Note that the term 'antenna' as used in this document is also used to refer to an array element. Each array element can be a subarray of antennas in itself. For example, each of the TX or RX array elements could be a vertical subarray of antennas by itself.

In one embodiment, a related signal processing unit is based on Xilinx, San Jose, Calif., Zynq 7000 series combined microprocessor FPGA SoC. This unit controls the radar front end and simultaneously processes the intermediate frequency (IF) data. In each radar frame, a 100 μs chirp of up to 1 GHz bandwidth is transmitted from each of the 36 TX channels, where some of the chirps are increasing in frequency (up chirp) and some decreasing (down chirp). The processing unit receives the sampled IF data via parallel bus using an integrated FIFO buffer. A 512 point FFT is then computed for each RX-TX pair. Then, a 3D FFT is performed on the result corresponding to velocity, azimuth and elevation dimensions. The 3D FFT is performed in a hierarchical manner such that only bins where there is a reasonable probability of target presence are processed in subsequent steps. This approach yields a sparse output from each FFT step to the next which in the average case significantly reduces the amount of processing. Finally, a list of 4D voxels (range, velocity, azimuth, elevation) are generated having an indication of the probability that a target is present in a particular voxel. This probability is computed against the noise distribution (null hypothesis) calculated in the negative frequency spectrum which is composed from the noise components and not from real targets.

Figure 6:
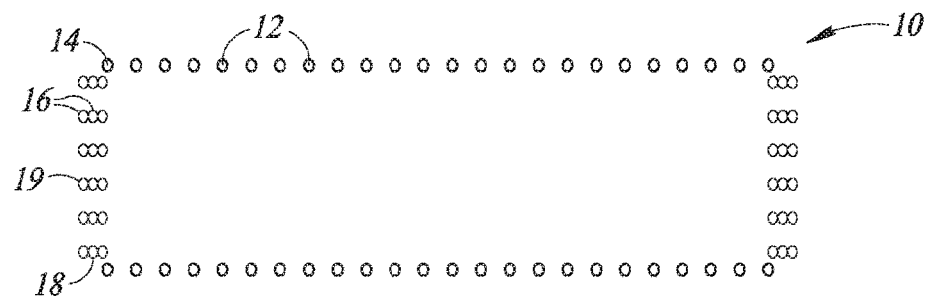
FIG. 6 is a diagram illustrating an example MIMO virtual radar antenna array based on two RX rows and six TX columns.

A diagram illustrating an example MIMO virtual radar antenna array based on two RX rows and six TX columns is shown in FIG. 6. The array, generally referenced 10, comprises a plurality of RX rows 14 each having a plurality of receive elements 12, a plurality of TX columns 18 each having a plurality of transmit elements 16 arranged in multiple rows 19 of three TX elements each.

Figure 7:
FIG. 7 is a diagram illustrating a resulting virtual array of the antenna array shown in FIG. 6.

In this embodiment, the MIMO virtual radar antenna array is based on two receiver rows and six transmitter columns, three per side. The horizontal distance between RX antenna elements is $3\lambda/2$ and the horizontal distance between TX columns is $\lambda/2$. In one example embodiment, 36 TX and 72 RX elements are used. This results in a full virtual array of size 12×216 which is shown in FIG. 7. The full virtual array, generally referenced 20, comprises a plurality of virtual antenna elements 22.

Note that this antenna array configuration enables a full virtual array but has several properties that can use improvement. First, the resulting elevation resolution of the array may not be sufficient for some applications. Second, there are two azimuth sidelobes (~25 dB down) at angles where $\sin \theta$ is $\pm\frac{2}{3}$ apart from the correct angle. Third, in some applications, the TX and RX elements are too close to each other, resulting in isolation problems between physical antenna elements.

Figure 8:
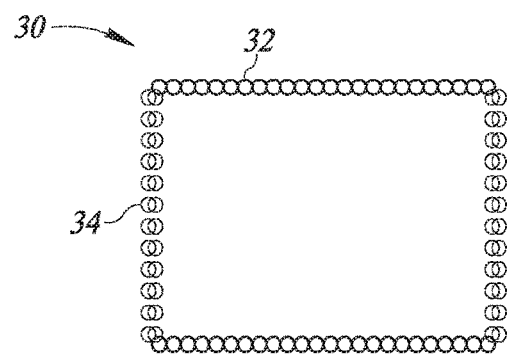
FIG. 8 is a diagram illustrating an example MIMO virtual radar antenna array based on two RX rows and four TX columns.

A diagram illustrating an example MIMO virtual radar antenna array based on two RX rows and four TX columns is shown in FIG. 8. The array, generally referenced 30, comprises a plurality of RX rows each having a plurality of receive elements 32, a plurality of TX columns each having a plurality of transmit elements 34 arranged in multiple rows of two TX elements each.

In this improved embodiment, the antenna array configuration addresses all of the above mentioned problems by modifying the position and configuration of the TX and RX elements. In order to improve the elevation resolution of the antenna, the TX-RX elements ratio and position is modified.

Figure 9:
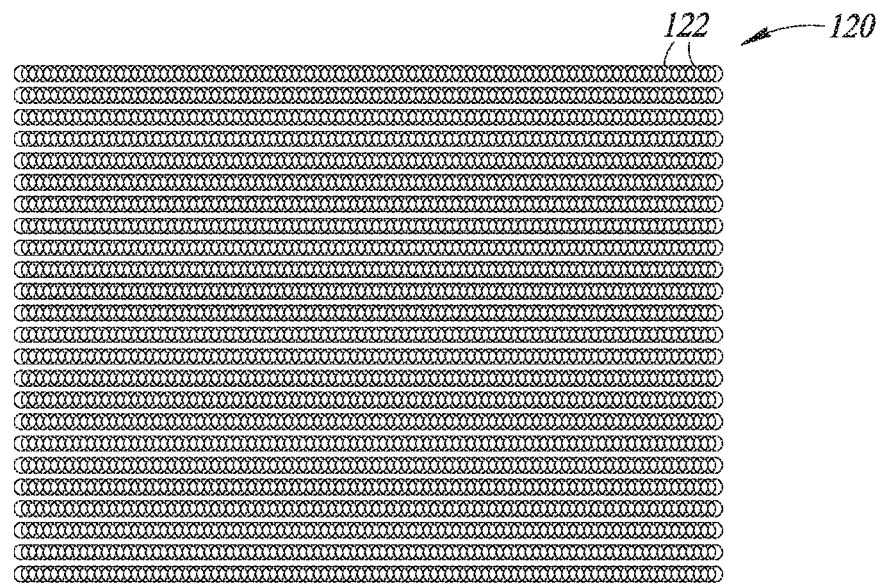
FIG. 9 is a diagram illustrating a resulting virtual array of the antenna array shown in FIG. 8.

In one example embodiment, 48 TX and 48 RX elements are used. Two RX rows with 24 elements each and four TX columns (two on each side) are used to create a virtual array shown in FIG. 9. The virtual array, generally referenced 120, comprises a plurality of virtual antenna elements 122. This virtual array exhibits greater vertical (i.e. elevation) proportions. Note that in this embodiment, the array uses a horizontal RX distance of A and horizontal TX distance of $\lambda/2$. The virtual array is full and is of size 24×96.

Note that the azimuth resolution in this case is reduced but the number of azimuth sidelobes due to TX antenna multiplexing is reduced to one (i.e. the number of one sided columns minus one).

Figure 10:
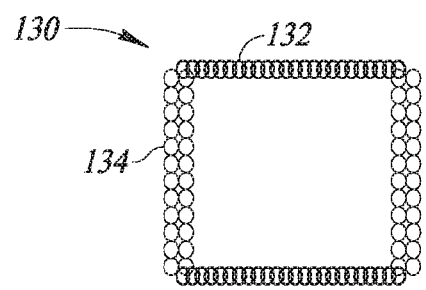
FIG. 10 is a diagram illustrating an example MIMO virtual radar antenna array based on two RX rows and four TX columns with increased separation between TX elements.

In another improved embodiment, an antenna array shape is used that attempts to improve isolation between elements by increasing the separation between TX elements. A diagram illustrating an example MIMO virtual radar antenna array based on two RX rows and four TX columns with increased separation between TX elements is shown in FIG. 10. The antenna array, generally referenced 130, comprises a plurality of RX rows each having a plurality of receive elements 132, a plurality of TX columns each having a plurality of transmit elements 134 arranged in multiple rows of two TX elements each.

It is noted that although the antenna array of FIG. 8 is full, the distance between the TX elements is relatively small ($\lambda/2$) which causes isolation problems between the TX transmitters. Isolation is greatly improved by modifying the horizontal distance between TX columns to $3\lambda/2$.

Figure 11:
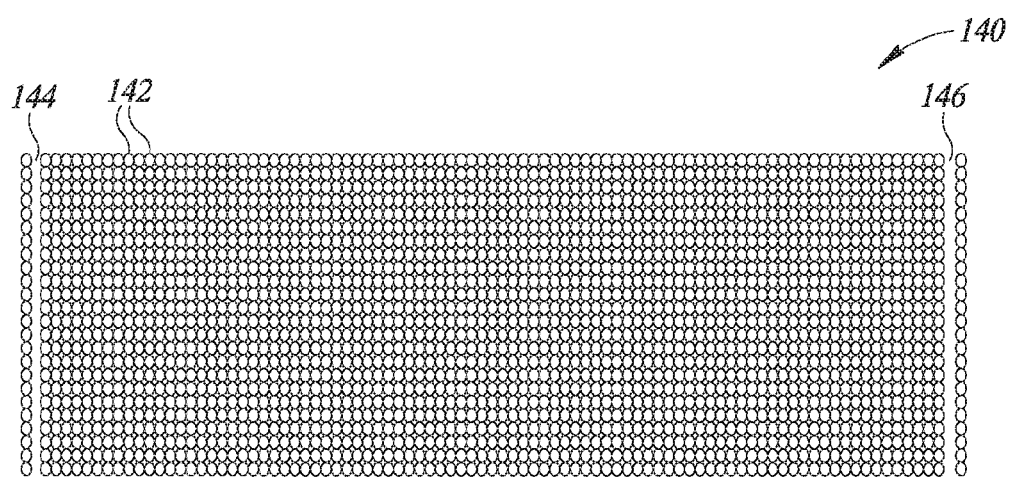
FIG. 11 is a diagram illustrating a resulting virtual array of the antenna array shown in FIG. 10.

A diagram illustrating a resulting virtual array of the antenna array shown in FIG. 10 is shown in FIG. 11. The virtual array, generally referenced 140, comprises a plurality of virtual antenna elements 142. Two vertical gaps 144, 146, however, are created in the edges of the virtual array.

Figure 12:
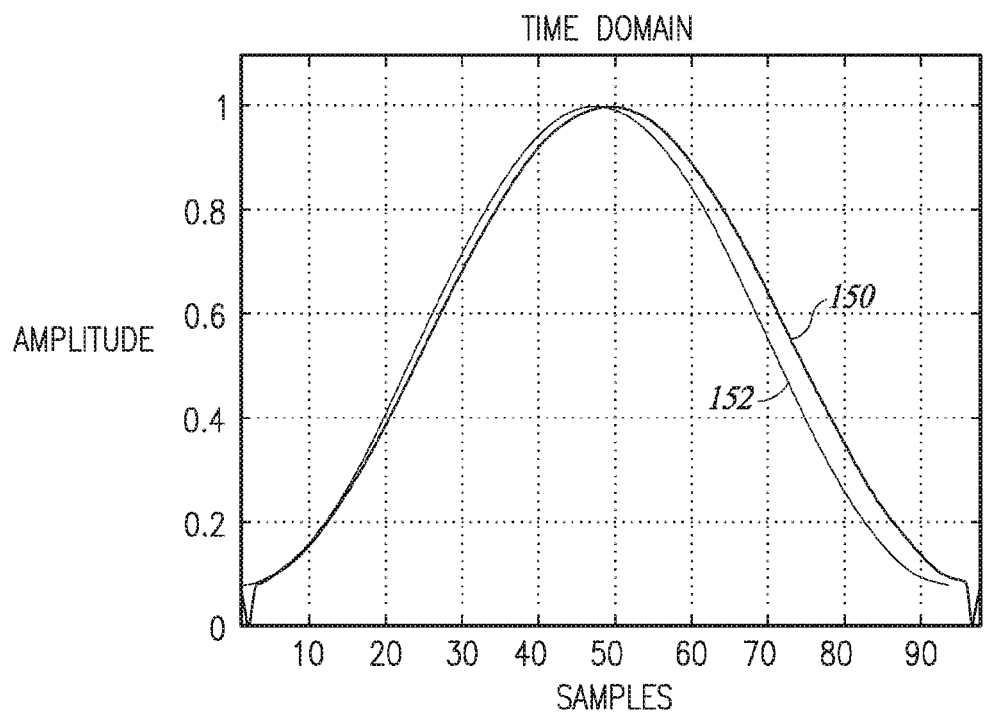
FIG. 12 is a diagram illustrating a time domain simulation of the example antenna array of FIG. 10.
Figure 13:
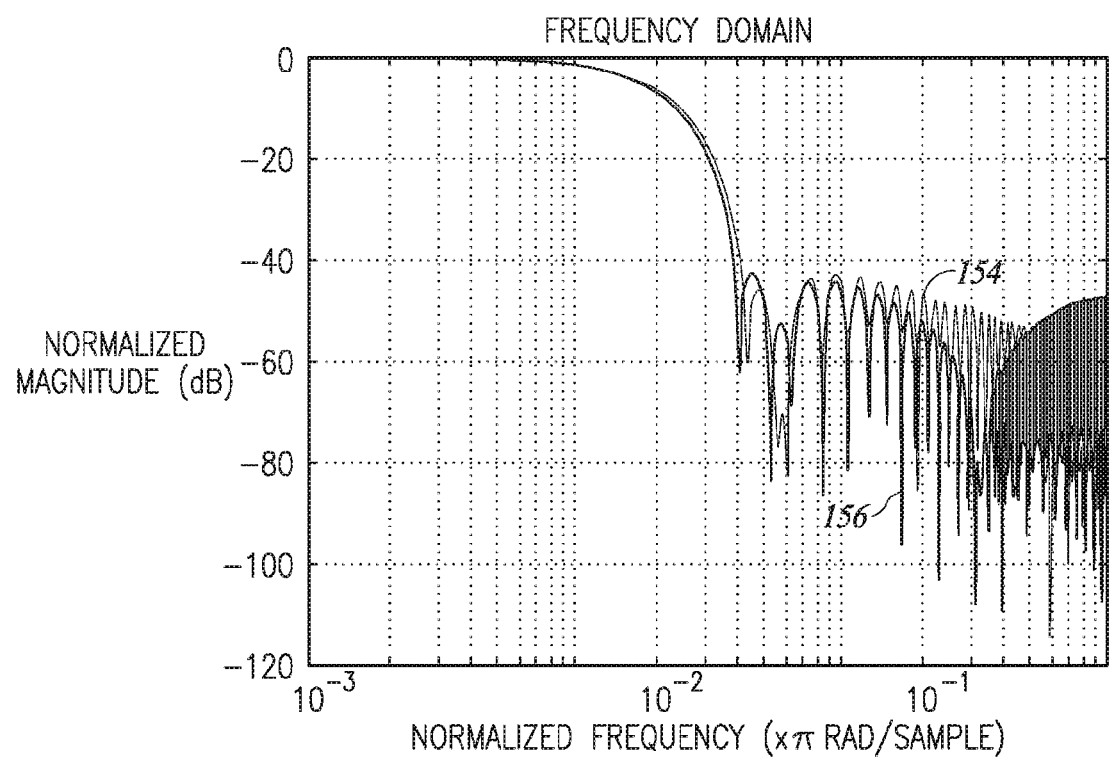
FIG. 13 is a diagram illustrating a frequency domain simulation of the example antenna array of FIG. 10.

Depending on the particular implementation of the invention, either (1) the sides of the array can be discarded to remove the gaps, or (2) the gaps can simply be ignored. A diagram illustrating a time domain simulation of the example antenna array of FIG. 10 is shown in FIG. 12 where curve 150 is with the gaps (i.e. the gaps are ignored) and curve 152 is with the gaps removed. A diagram illustrating a frequency domain simulation of the example antenna array of FIG. 10 is shown in FIG. 13 where curve 156 is with the gaps (i.e. the gaps are ignored) and curve 154 is with the gaps removed. As can be seen in the simulations, the effects of the gaps in the side edges of the virtual array is not significant, and in many cases no special processing treatment is required. Example related Hamming window code is as follows: win1=hamming(94); win2=hamming(98); win2 ([2 (end−1)])=0; wvtool(win1,win2).

Figure 14:
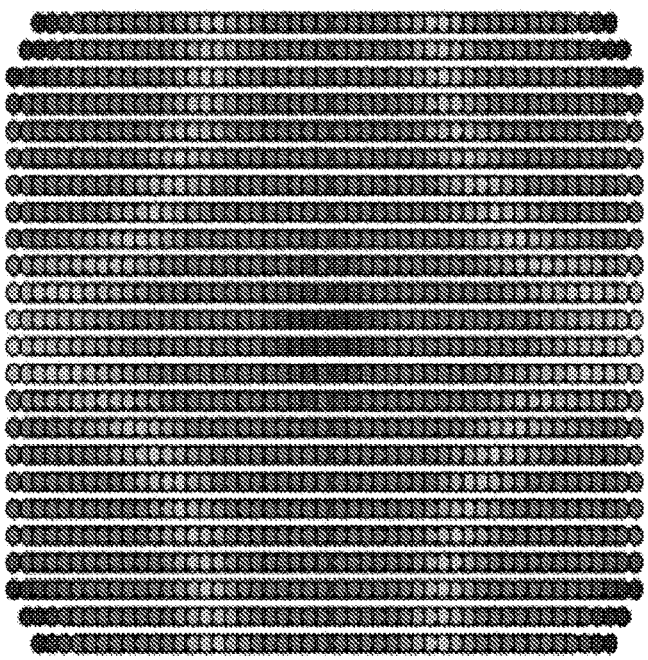
FIG. 14 is a diagram illustrating a first example virtual array after close corner elements are discarded.
Figure 15:
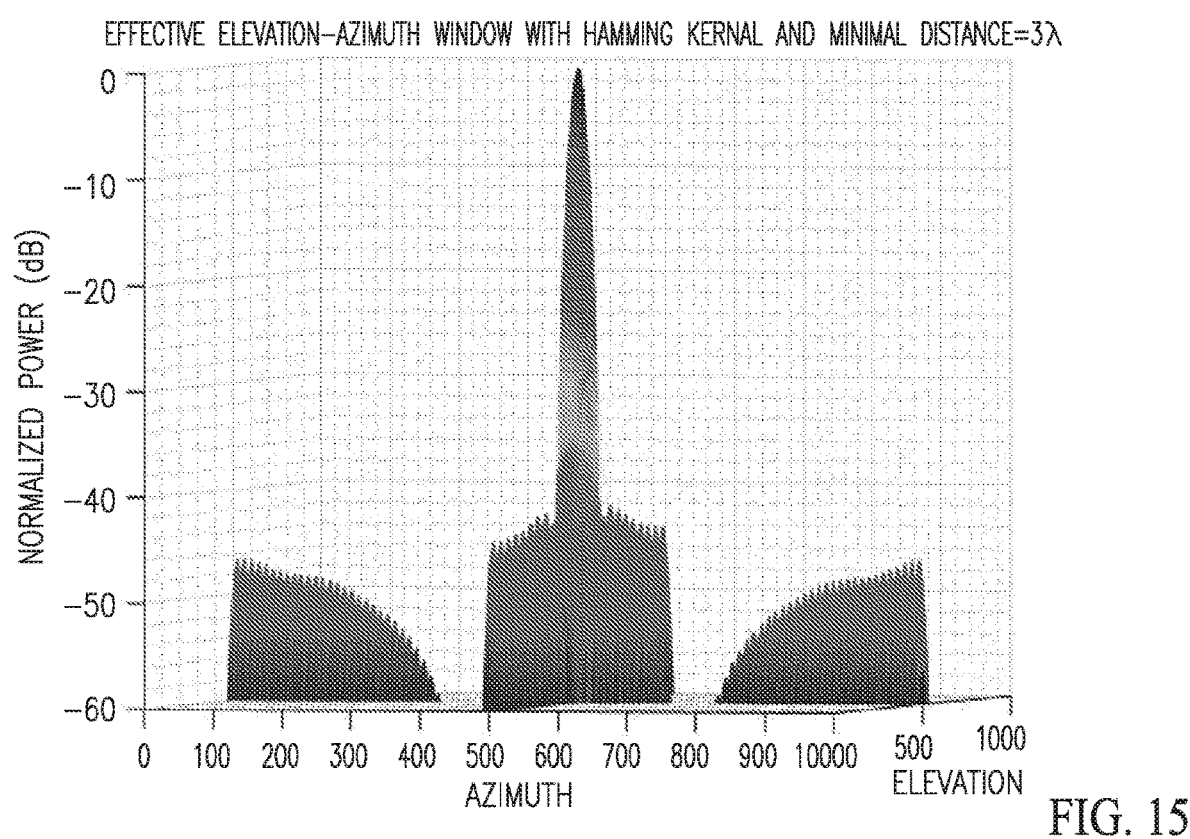
FIG. 15 is a diagram illustrating an example effective elevation-azimuth window.

In one embodiment, to further improve the isolation between the TX and TX elements, virtual elements with a distance below a certain value are discarded, thus creating gaps in the virtual array and a more circular virtual array shape as opposed to the initial rectangular shape for the full array. A diagram illustrating a first example virtual array after close corner elements are discarded is shown in FIG. 14. Using a minimal TX-RX distance of $3\lambda$, the example virtual array is shown after discarding close elements. It is noted that no special treatment is needed for the virtual array is required, despite the new gaps. A diagram illustrating an example effective elevation-azimuth window is shown in FIG. 15.

Figure 16:
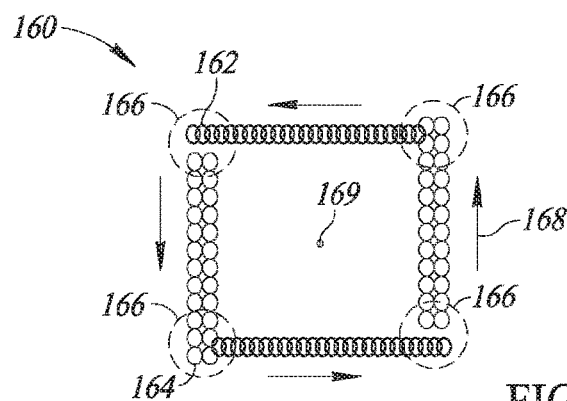
FIG. 16 is a diagram illustrating an example antenna array with skewed or staggered rows and columns.
Figure 17:
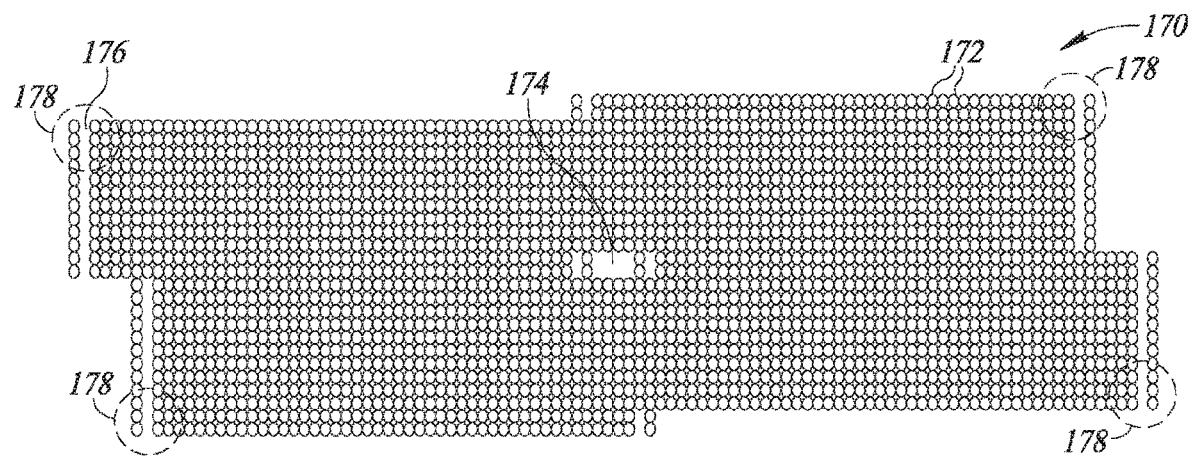
FIG. 17 is a diagram illustrating a resulting virtual array of the antenna array shown in FIG. 16.

In another embodiment, improved antenna element separation is achieved by distancing (i.e. staggering, skewing, offsetting, etc.) the RX rows and TX columns by using row and column circular shifts. A diagram illustrating an example antenna array with skewed or staggered rows and columns is shown in FIG. 16. The antenna array, generally referenced 160, comprises a plurality of RX rows each having a plurality of receive elements 162, a plurality of TX columns each having a plurality of transmit elements 164 arranged in multiple rows of two TX elements each. A diagram illustrating a resulting virtual array of the antenna array shown in FIG. 16 is shown in FIG. 17.

Note that due to the physical size of the antenna elements, it is not possible to place the rows and columns in the full array symmetric RX-TX pattern without creating a gap in the center of the virtual array.

To overcome this problem while minimizing the size of the gap in the center of the array, in one embodiment, the rows and columns are shifted (i.e. skewed, staggered, or offset) along their major axis. In one example antenna array, each of the columns is shifted by $3\lambda/2$ and each of the rows by $3\lambda/2$ along their respective major axis. This creates a virtual array, generally referenced 170, comprising a plurality of virtual elements 172 with gaps 176 at the edges and gap 176 in the venter of the array pattern.

This array reduces the overall size of the antenna achieving a compact size and low side lobe level (SLL). This configuration also allows a relatively simple physical antenna layout where the elements do not overlap each other. For example, considering a patch antenna element, a high gain element in the receive array can be used by combining several patches vertically. The receiver element can be increased in size by further skewing the transmitter array and freeing up more space. This array design provides a general frame array design principle in which a designer chooses the vertical and/or horizontal skewing factor of the transmitter array and the horizontal and/or vertical skewing factor of the receiver array.

The skewing factor is the size of the shift in which the symmetric edges (i.e. upper and lower rows, left and right columns) are translated (i.e. shifted, skewed, or moved). For example, a skewing factor of D (in meters) for the receiver array shown in FIG. 10 means that the upper RX row is shifted left by a receive skew factor distance $D_{RX}$ and the lower RX row is shifted right (opposite direction) by skew factor $D_{RX}$. The left TX column is shifted down by a transmit skew factor distance $D_{TX}$ and the right TX column is shifted up (opposite direction) by skew factor $D_{TX}$. Skew factors $D_{RX}$ and $D_{TX}$ can be positive or negative and are typically not the same for rows and columns but can be. In one embodiment, the transmit skewing factor $D_{TX}$ is an integer multiple of half the distance between the transmit elements in the physical array and the receive skewing factor $D_{RX}$ is an integer multiple of half the distance between the receive elements in the physical array. For example, if the distance between the receiving elements is $1\lambda$, then $D_{RX}$ is a multiple of $\lambda/2$. This is preferable in order to achieve a uniform virtual array with constant distance between elements everywhere (except for the gaps).

In general, the upper and lower rows and left and right columns in the antenna frame array are skewed in a circular pattern around a center point 169 in the direction of arrows 168. In other words, the upper row is shifted to the left, the left column is shifted down, the lower row is shifted to the right, and the right column is shifted up. Note that in the example embodiment shown in FIG. 16, the skewing is performed in a counterclockwise direction. Alternatively, the array can be skewed in a clockwise direction.

Note that in an alternative embodiment, the upper RX row can be shifted right and the lower RX row shifted left. In addition, the left TX column can be shifted up and the right TX column shifted down.

In an example embodiment, the receive and transmit skewing factors for the physical antenna frame array are $D_{RX}=8\lambda/2$ and $D_{TX}=3(3\lambda/2)/2$. The horizontal spacing for the receive physical elements in the upper and lower rows is $\lambda$. The vertical spacing for the transmit physical elements in the left and right columns is $3\lambda/2$. Other spacings are possible as well depending on the particular implementation. In another embodiment, the TX and RX physical spacing are co-prime, however, the invention is not limited to this spacing.

Figure 18:
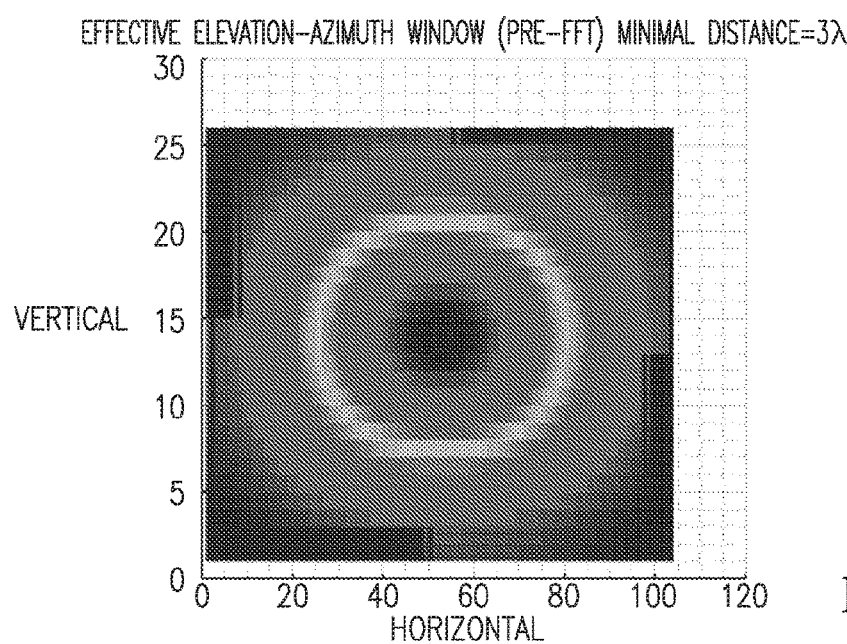
FIG. 18 is a diagram illustrating an example effective window function for minimal TX-RX virtual elements.
Figure 19:
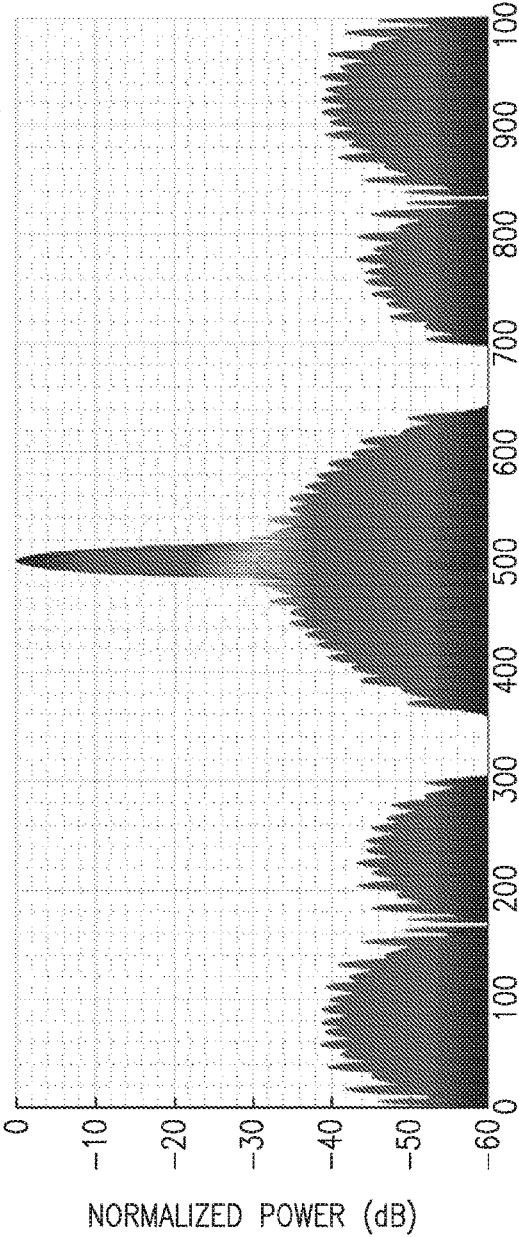
FIG. 19 is a diagram illustrating an example azimuth window for the antenna array of FIG. 16.
Figure 20:
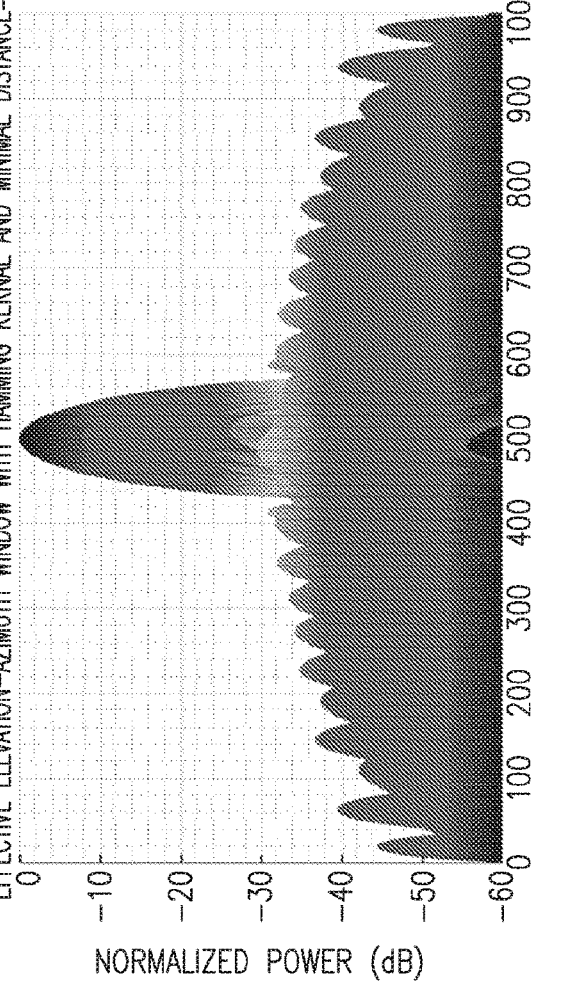
FIG. 20 is a diagram illustrating an example elevation window for the antenna array of FIG. 16.

A diagram illustrating an example effective window function for minimal TX-RX virtual elements distance of $3\lambda$ (hamming window on both axes) is shown in FIG. 18. A diagram illustrating an example azimuth window for the antenna array of FIG. 16 is shown in FIG. 19. A diagram illustrating an example elevation window for the antenna array of FIG. 16 is shown in FIG. 20. The graphs indicate a side lobe level of approximately −30 dB in azimuth and elevation.

It is noted that the effect of the gaps in the virtual array can be seen in FIGS. 18, 19, 20. In this example, the selected doppler is not exactly on the FFT grid, thus an azimuth sidelobe −30 dB down is also present. The window properties as a function of the shift in the rows and columns for the ideal case is shown in Table 1 below. Note that RX rows are shifted horizontally and TX columns are shifted vertically. In addition, $H_{min}$ denotes the minimal horizontal distance between receiver and transmitter while $V_{min}$ denotes the minimal vertical distance between receiver and transmitter. Note also that the distance between RX elements is $\lambda$ (i.e. horizontal), and between TX elements is $1.5\lambda$ (i.e. both horizontal and vertical). The minimal RX-TX distance for virtual elements is $3\lambda$.

TABLE 1

Azimuth sidelobe evel (ASL) and elevation sidelobe level (ESL) as a function of shifts for an ideal Hamming based window

| TX shift/ RX shift | $1.5\lambda$ ($H_{min} = 1.25\lambda$) | $2\lambda$ ($H_{min} = 1.75\lambda$) | $2.5\lambda$ ($H_{min} = 2.25\lambda$) | $3\lambda$ ($H_{min} = 3.25\lambda$) |
|---|---|---|---|---|
| $1.5\lambda$ ($V_{min} = 2.25\lambda$) | ASL = −29.47 dB ESL = −30.92 dB | ASL = −27.91 dB ESL = −29.41 dB | ASL = −26.08 dB ESL = −28.08 dB | ASL = −24.8 ESL = −26.86 |
| $2.25\lambda$ ($V_{min} = 3\lambda$) | ASL = −27.91 dB ESL = −27.49 dB | ASL = −25.79 dB ESL = −26.16 dB | ASL = −24.16 dB ESL = −24.97 dB | ASL = −22.96 dB ESL = −23.88 dB |
| $3\lambda$ ($V_{min} = 3.75\lambda$) | ASL = −25.76 dB ESL = −25.04 dB | ASL = −23.95 dB ESL = −23.84 dB | ASL = −22.54 dB ESL = −22.75 dB | ASL = −21.42 dB ESL = −21.75 dB |
| $3.75\lambda$ ($V_{min} = 4.5\lambda$) | ASL = −24.21 dB ESL = −23.3 dB | ASL = −22.44 dB ESL = −22.17 dB | ASL = −21.08 dB ESL = −21.16 dB | ASL = −19.9 dB ESL = −20.22 dB |

Figure 21:
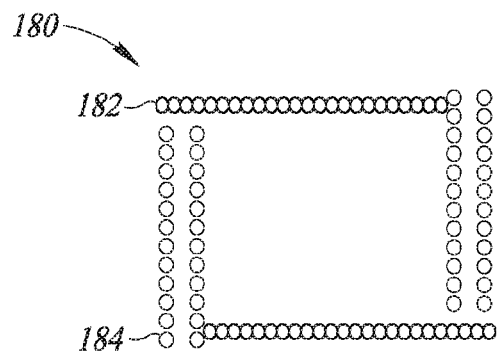
FIG. 21 is a diagram illustrating an example antenna array with skewed or staggered rows and columns having increased distance between TX columns.
Figure 22:
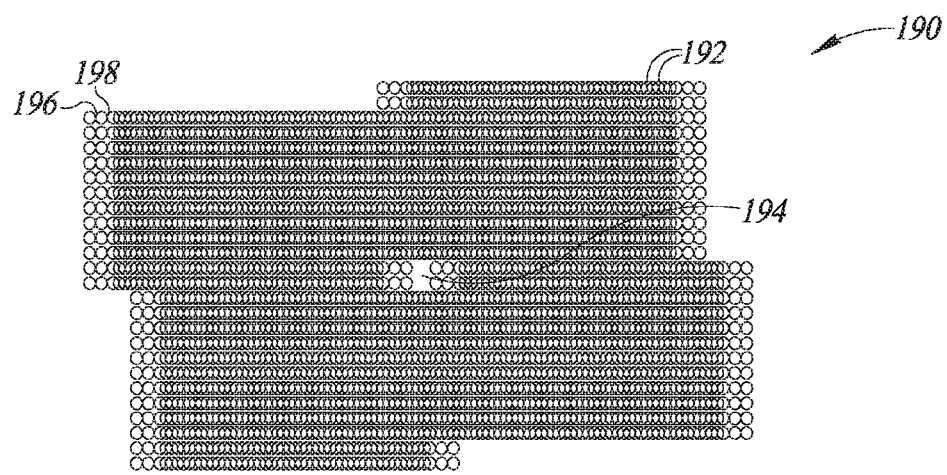
FIG. 22 is a diagram illustrating a resulting virtual array of the antenna array shown in FIG. 21.

In another embodiment, the distance between TX columns in the antenna array is increased. A diagram illustrating an example antenna array with skewed or staggered rows and columns having increased distance between TX columns is shown in FIG. 21. The antenna array, generally referenced 180, comprises a plurality of RX rows each having a plurality of receive elements 182, a plurality of TX columns each having a plurality of transmit elements 184 arranged in multiple rows of two TX elements each. A diagram illustrating a resulting virtual array of the antenna array shown in FIG. 21 is shown in FIG. 22. The virtual array, generally referenced 190, comprises a plurality of virtual elements 192 with gaps 196, 198 at the edges and gap 194 in the center of the array pattern.

Figure 23:
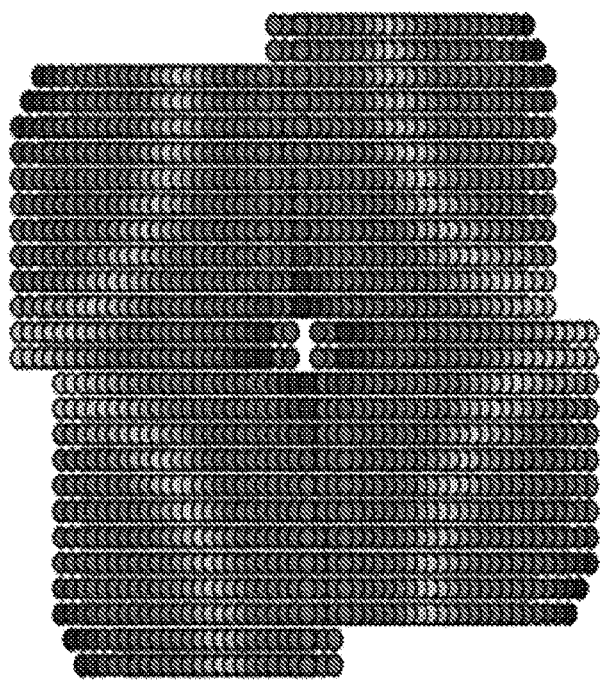
FIG. 23 is a diagram illustrating a second example virtual array after close corner elements are discarded.
Figure 24:
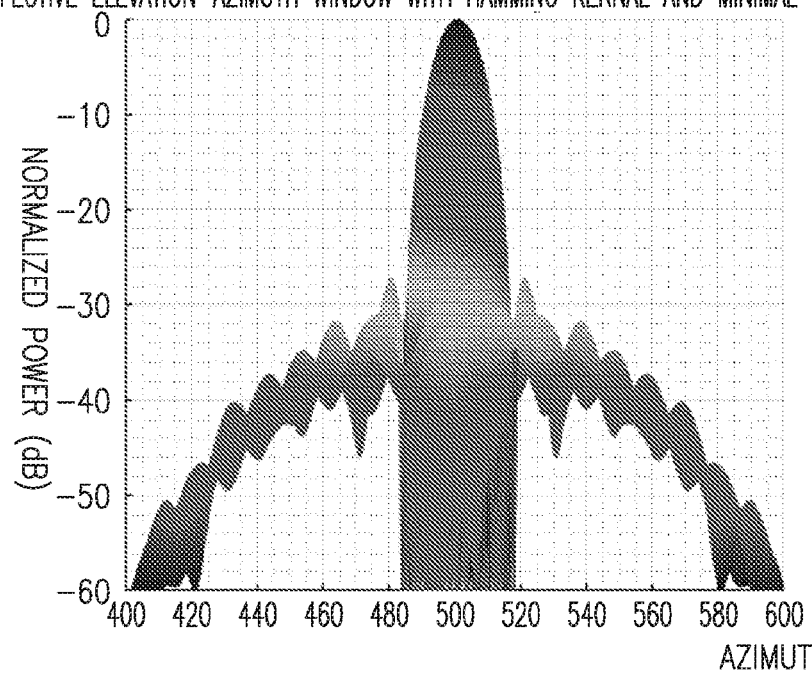
FIG. 24 is a diagram illustrating an example azimuth window for the antenna array of FIG. 21.
Figure 25:
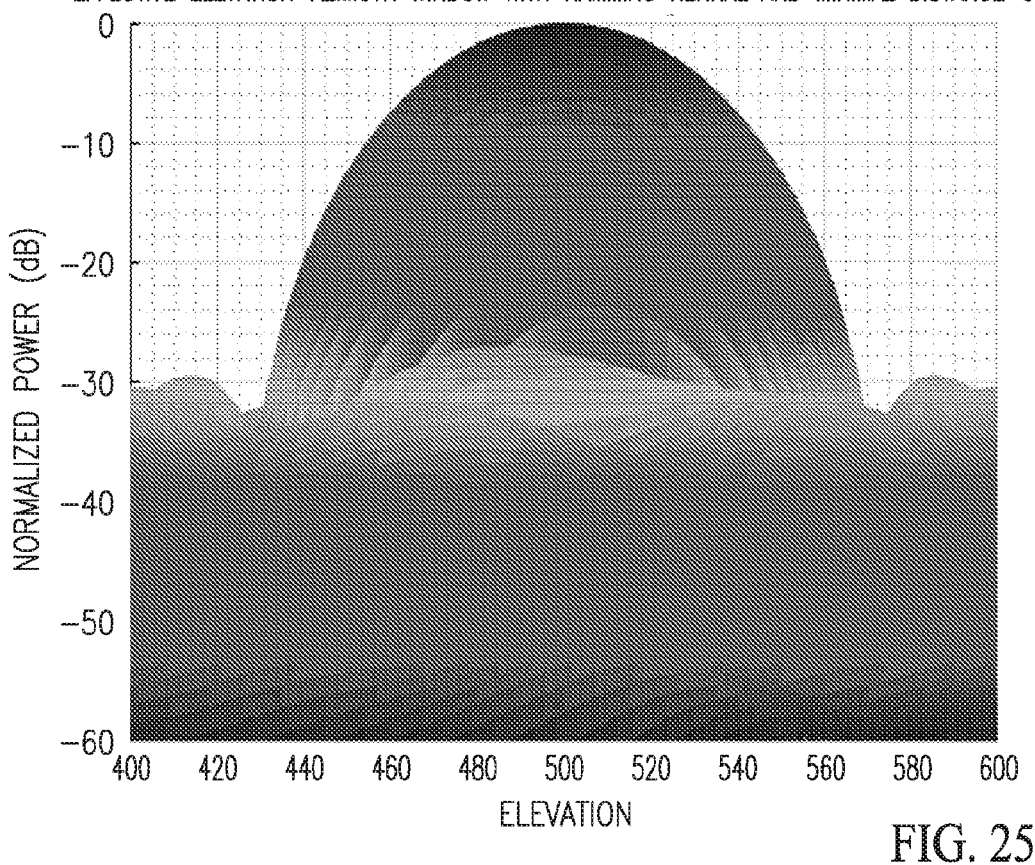
FIG. 25 is a diagram illustrating an example elevation window for the antenna array of FIG. 21.

A diagram illustrating a second example virtual array after close corner elements are discarded is shown in FIG. 23. A diagram illustrating an example azimuth window for the antenna array of FIG. 21 is shown in FIG. 24. As shown, the first azimuth sidelobe is over −27 dB down. A diagram illustrating an example elevation window for the antenna array of FIG. 21 is shown in FIG. 25. As shown, the first elevation sidelobe is approximately −30 dB down.

The sidelobe levels as a function of shifts for an ideal Hamming based window for TX column horizontal distance of 2.5λ (min RX-TX distance 3λ) are presented below in Table 2. Note that RX rows are shifted horizontally and TX columns are shifted vertically. In addition, $H_{min}$ denotes the minimal horizontal distance between receiver and transmitter while $V_{min}$ denotes the minimal vertical distance between receiver and transmitter.

antenna, i.e. the four corners of the virtual array. An example of the affected TX and RX antenna elements are shown in FIG. 16 where the elements within circles 166 at the corners of the array are those that are blanked. The virtual antenna elements affected by the blanking are shown in FIG. 17 within circles 178 at the corners of the virtual array.

Moreover, the virtual array is not significantly affected by the blanking since windowing is performed before the FFT for azimuth and elevation is performed. During windowing, the data is multiplied by a two-dimensional window which functions to attenuate the data at the edges of the window due to weighting.

Blanking the data at the fringe antenna elements allows the overlap of the TX/RX antenna elements and therefore removes the requirement for a gap filler. Thus, in exchange for some minor data loss at the corners of the virtual array, the staggered antenna array results in a relatively small hole in the center of the virtual array eliminating the need for a gap filler. The small hole in the center of the array can be ignored and radar data processing can proceed without any modifications on behalf of the hole. Alternatively, the hole can be filled and radar data processing modified accordingly. In the embodiments presented herein, the hole and gaps at the edges are ignored.

In another embodiment, in addition to the above techniques, the elements making up the transmitter array which consists of several columns on each edge of the frame array, can be horizontally staggered row by row. A diagram illustrating an example antenna array with skewed or staggered RX rows and TX columns with additional staggering of the

TABLE 2

Sidelobe level (SL) as a function of shifts for ideal hamming based window for TX column horizontal distance of 2.5λ (min RX-TX distance 3λ)

| TX shift\ RX shift | 2λ ($H_{min}$ = 1.25λ) | 2.5λ ($H_{min}$ = 1.75λ) | 3λ ($H_{min}$ = 2.25λ) | 3.5λ ($H_{min}$ = 3.25λ) |
|---|---|---|---|---|
| 1.5λ | ASL = −27.08 dB | ASL = −25.65 dB | ASL = −24.5 dB | ASL = −23.56 dB |
| ($V_{min}$ = 2.25λ) | ESL = −29.44 dB | ESL = −28.09 dB | ESL = −26.86 dB | ESL = −25.78 dB |
| 2.25λ | ASL = −25.29 dB | ASL = −23.92 dB | ASL = −22.81 dB | ASL = −21.7 dB |
| ($V_{min}$ = 3λ) | ESL = −26.21 dB | ESL = −25.01 dB | ESL = −23.92 dB | ESL = −22.92 dB |
| 3λ | ASL = −23.75 dB | ASL = −22.39 dB | ASL = −21.2 dB | ASL = −20.23 dB |
| ($V_{min}$ = 3.75λ) | ESL = −23.89 dB | ESL = −22.8 dB | ESL = −21.8 dB | ESL = −20.89 dB |
| 3.75λ | ASL = −22.36 dB | ASL = −20.98 dB | ASL = −19.9 dB | ASL = −18.93 dB |
| ($V_{min}$ = 4.5λ) | ESL = −22.23 dB | ESL = −21.22 dB | ESL = −20.31 dB | ESL = −19.41 dB |

In one embodiment, the TX and RX elements in the staggered antenna array such as shown in FIG. 16 overlap in order to preserve space. As a result of this arrangement there are TX antennas which are in close proximity to RX antennas at the corners of the frame. These TX and RX elements are referred to as fringe elements. The fringe TX antennas are close to RX antennas at the corners of the frame. Thus, when transmitting from a fringe TX antenna, the closest RX antenna will receive a relatively strong signal and the RX chain (e.g., LNA, ADC, etc.) will likely be saturated. This means the resultant radar data will be corrupted and not usable for the virtual array.

Figure 26:
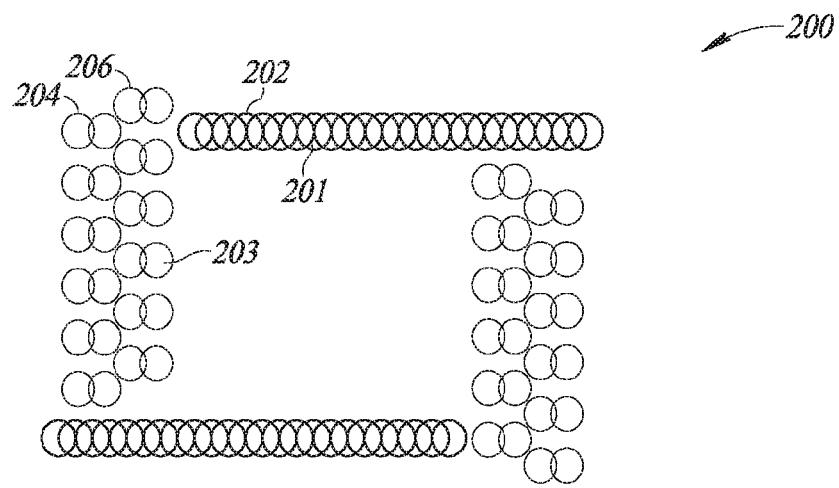
FIG. 26 is a diagram illustrating an example antenna array with skewed or staggered RX rows and TX columns with additional staggering of the TX column sub-rows.
Figure 27:
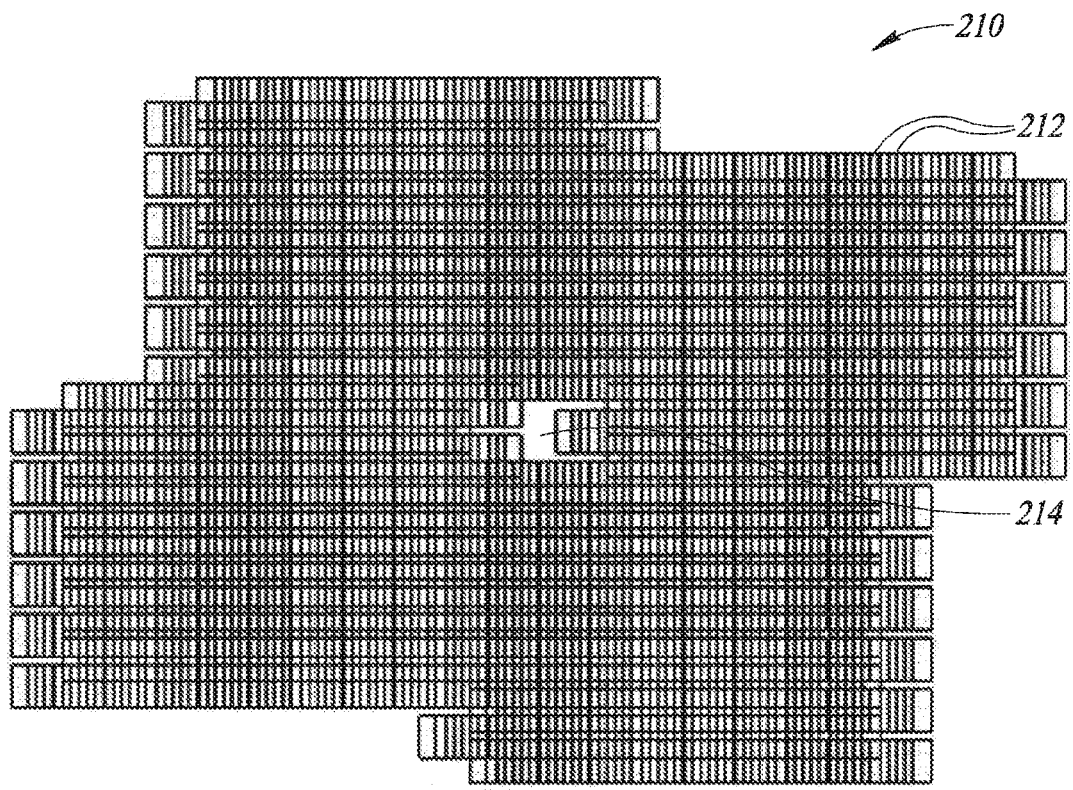
FIG. 27 is a diagram illustrating a resulting virtual array of the antenna array shown in FIG. 26.

As a solution to this problem, in one embodiment of the present invention, the data output of the ADC for the affected RX channel is replaced with zeros thereby blanking the data. What is important, however, is the effect this has on the virtual array since the beamforming is performed on the virtual array. Applying data blanking to the virtual array, however, does not result in a significant loss since the array is affected, i.e. data is lost, only when transmitting from the fringe TX antenna and receiving from the fringe RX TX column sub-rows is shown in FIG. 26. The antenna array, generally referenced 200, comprises a plurality of RX rows 202 each having a plurality of receive elements 201, a plurality of TX columns 204 each having a plurality of transmit elements 203 arranged in staggered sub-rows 206 of two TX elements each. To avoid confusion with the rows of the array, the rows of the columns are referred herein to as sub-rows. A diagram illustrating a resulting virtual array of the antenna array shown in FIG. 26 is shown in FIG. 27. The virtual array, generally referenced 210, comprises a plurality of virtual elements 212 with gaps 216 at the edges and gap 214 in the center of the array pattern.

The staggering of the transmit antenna array column in this embodiment effectively frees more space for each element in the transmit array so that a larger element with more gain can be used to improve the overall sensitivity of the radar and its ability to detect small objects at long ranges. In one embodiment, the staggering is performed symmetrically on both left and right edges of the frame array so that the distance between the two edges for each transmit sub-row still corresponds to the size of the receive array as in regular (i.e. non-staggered) MIMO arrays. In this example, the sub-rows are staggered such that every second transmitter sub-row is shifted to the right. Note that the staggering (or skewing) is implemented symmetrically, meaning that for any sub-row, the elements in both columns are skewed (shifted) exactly the same way and the same direction. Note that the elements in each sub-row can be skewed to the left or right or may remain in the center. Alternatively, the elements may be skewed in any desired fashion according to the particular implementation. If the staggering (or skewing) is not implement symmetrically, this would add one or more new holes or gaps to the resulting virtual antenna array. Note further that having overlapping virtual antenna elements avoids having a hole or gap in the center of the virtual array.

In an alternative embodiment, the elements in the upper and lower rows of the antenna frame array are staggered vertically in addition to or instead of the horizontal staggering of the sub-rows of the columns.

Figure 29:
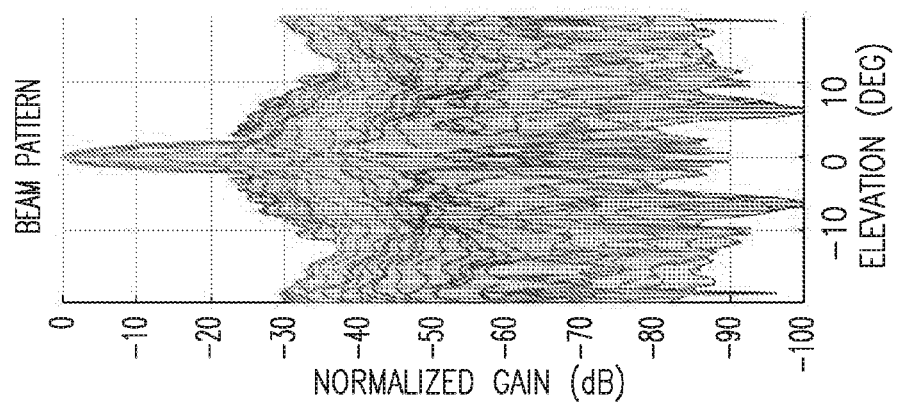
FIG. 29 is a diagram illustrating an example elevation window for the antenna array of FIG. 26.
Figure 28:
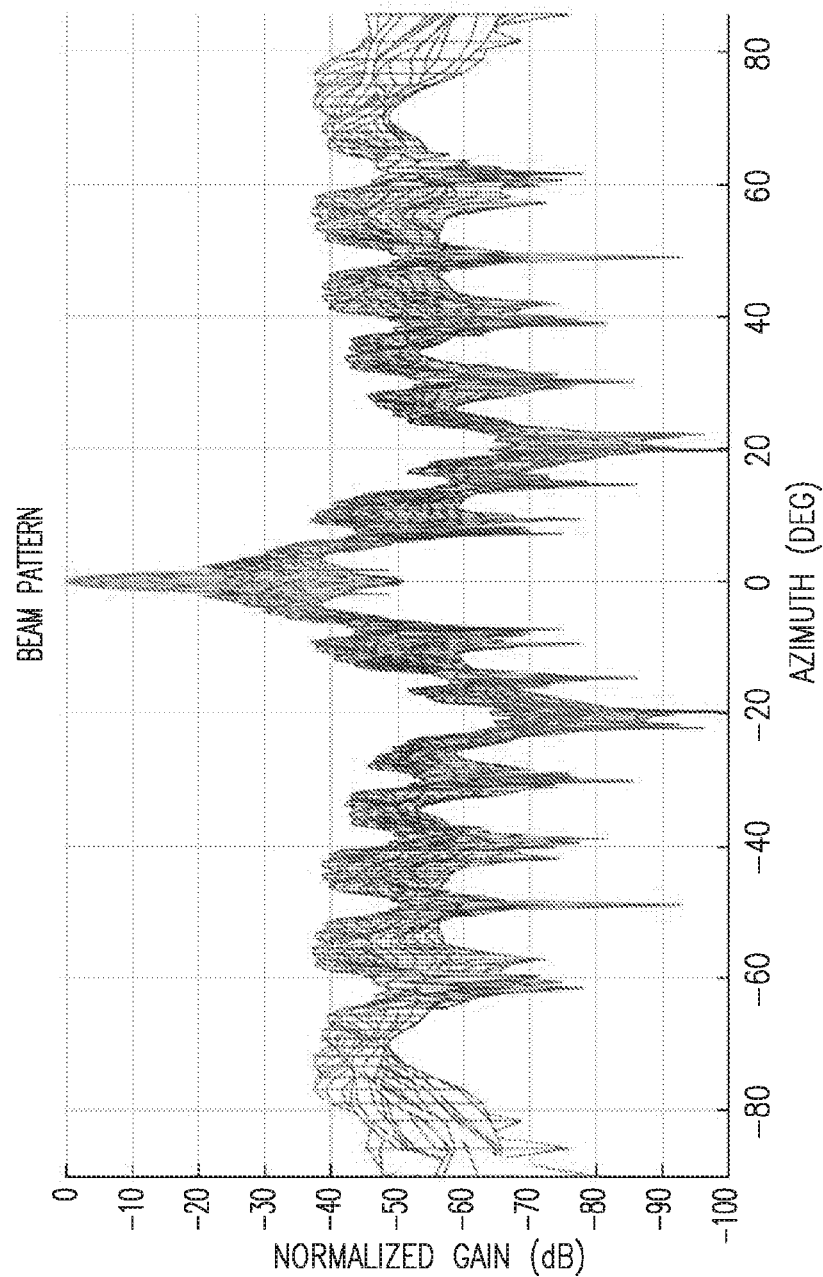
FIG. 28 is a diagram illustrating an example azimuth window for the antenna array of FIG. 26.

A diagram illustrating an example azimuth window for the antenna array of FIG. 26 is shown in FIG. 28. As shown, the sidelobe level is approximately −37 dB down. A diagram illustrating an example elevation window for the antenna array of FIG. 26 is shown in FIG. 29. As shown, the sidelobe level is approximately −30 dB down.

Note that for an odd multiple skewing factor of the transmitter array, an anti symmetric staggering of the two edges is performed. For an even multiple skewing factor a symmetric staggering is required. This means that for a particular sub-row, elements across the entire sub-row (i.e. both columns) are skewed identically. The staggering shift is preferably an integer multiple of the distance between the elements in the virtual array. This creates a uniform array with additional gaps only on the boundary (i.e. edges) of the virtual array. This approach allows for a higher transmitter element gain with very minimal impact on the sidelobe level. In addition, this technique can be used to increase the gain of the antenna elements even further by introducing multiple shifts. For example, some of the rows can be shifted left while others can be shifted to the right.

Note that the skew factor for the column elements is an integer multiple of half a distance between virtual elements in columns of a virtual frame array. Similarly, the skew factor for the row elements is an integer multiple of half a distance between virtual elements in rows of a virtual frame array.

Note also that regarding the physical antenna frame arrays in the embodiments described herein, the antenna elements in the rows comprise receive antenna elements and the columns comprise transmit antenna elements. It is appreciated, however, that the transmit and receive elements may be switched whereby the rows comprise transmit antenna elements and the columns comprise receive antenna elements. Thus, the transmit and receive elements are interchangeable.

The antenna frame array embodiments described infra were described in the context of a TDM MIMO system. The invention, however, is not limited to such systems. The orthogonality of the transmitted waveforms, however, can be obtained using any desired mechanism, e.g., TDM MIMO, non-TDM MIMO, PMCW, FDM, spatial coding, etc.

Note further that the skewing mechanism of the present invention is not limited to the rectangular frame arrays disclosed herein and can be applied to antenna arrays having any desired shape, e.g., square, circular, elliptical, hexagon, octagon, etc.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the claims, any reference signs placed between parentheses shall not be construed as limiting the claim. The use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first," "second," etc. are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

The invention claimed is:

1. A multiple input, multiple output (MIMO) antenna frame array for use in a radar system, comprising:
   a first plurality of elements arranged in a first column and a second column, said second column spaced a first distance from said first column;
   a second plurality of elements arranged in a first row and a second row, said second row spaced a second distance from said first row;
   wherein said first column and second column are skewed vertically along their major axes in accordance with a first skew factor;
   wherein said first row and said second row are skewed horizontally along their major axes in accordance with a second skew factor; and
   wherein said first skew factor and said second skew factor are both greater than $\lambda/2$ where $\lambda$ is the wavelength of the transmitted radar pulse.

2. The MIMO antenna frame array according to claim 1, wherein said first plurality of elements comprise a plurality of transmit elements and said first skew factor comprises a transmit skew factor distance $D_{TX}$.

3. The MIMO antenna frame array according to claim 1, wherein said second plurality of elements comprise a plurality of receive elements and said second skew factor comprises a receive skew factor distance $D_{RX}$.

4. The MIMO antenna frame array according to claim 1, wherein said first column and said second column are skewed in opposite directions in accordance with said first skew factor.

5. The MIMO antenna frame array according to claim 1, wherein said first row and said second row are skewed in opposite directions in accordance with said second skew factor.

6. The MIMO antenna frame array according to claim 1, wherein said first skew factor comprises an integer multiple of half a distance between physical elements in said first column and said second column.

7. The MIMO antenna frame array according to claim 1, wherein said second skew factor comprises an integer multiple of half a distance between physical elements in said first row and said second row.

8. The MIMO antenna frame array according to claim 1, wherein said first plurality of elements are organized into a plurality of sub-rows in said first column and said second column, said plurality of sub-rows staggered sub-row by sub-row.

9. A multiple input, multiple output (MIMO) antenna frame array for use in a radar system, comprising:
   a first plurality of receive elements arranged in a first row and a second row, said second row spaced a first vertical distance from said first row;
   a second plurality of transmit elements arranged in a first column and a second column, said second column spaced a second horizontal distance from said first column; and
   wherein said first row, said second row, said first column, and said second column are skewed in circular fashion around a center point by a skew factor greater than $\lambda/2$ where $\lambda$ is the wavelength of the transmitted radar pulse.

10. The MIMO antenna frame array according to claim 9, wherein said first plurality of elements comprise a plurality of transmit elements and said first column and said second column are skewed in accordance with a first skew factor having a distance $D_{TX}$.

11. The MIMO antenna frame array according to claim 10, wherein said first skew factor comprises an integer multiple of half a distance between physical elements in said first column and said second column.

12. The MIMO antenna frame array according to claim 9, wherein said second plurality of elements comprise a plurality of receive elements and said first row and said second row are skewed in accordance with a second skew factor having a distance $D_{RX}$.

13. The MIMO antenna frame array according to claim 12, wherein said second skew factor comprises an integer multiple of half a distance between physical elements in said first row and said second row.

14. The MIMO antenna frame array according to claim 9, wherein said first column and said second column are skewed in opposite directions in accordance with a first skew factor, and wherein said first row and said second row are skewed in opposite directions in accordance with a second skew factor.

15. The MIMO antenna frame array according to claim 9, wherein said first column and said second column each comprise a plurality of sub-rows staggered row by row, each sub-row having a plurality of elements.

16. A multiple input, multiple output (MIMO) antenna frame array for use in a radar system, comprising:
   a first plurality of elements arranged in a first row and a second row, said second row spaced a first vertical distance from said first row;
   a second plurality of elements arranged in a first column and a second column, said second column spaced a second horizontal distance from said first column;
   wherein said first column and second column are skewed vertically along their major axes in accordance with a first skew factor;
   wherein said first row and said second row are skewed horizontally along their major axes in accordance with a second skew factor; and
   wherein said second plurality of elements are organized into a plurality of sub-rows within said first column and said second column, said plurality of sub-rows staggered sub-row by sub-row.

17. The MIMO antenna frame array according to claim 16, wherein elements in said sub-rows may be placed in an alternating pattern.

18. The MIMO antenna frame array according to claim 16, wherein elements in said sub-rows may be placed in a left position, center position, or right position.

19. The MIMO antenna frame array according to claim 16, wherein said first skew factor comprises an integer multiple of half a distance between virtual elements in columns of a virtual frame array.

20. The MIMO antenna frame array according to claim 16, wherein said second skew factor comprises an integer multiple of half a distance between virtual elements in rows of a virtual frame array.

* * * * *